United States Patent
Inoue et al.

(10) Patent No.: US 8,438,479 B2
(45) Date of Patent: May 7, 2013

(54) OPERATION SUPPORT APPARATUS AND METHOD OF THE SAME

(75) Inventors: Tsuyoshi Inoue, Nara (JP); Jun Ozawa, Nara (JP)

(73) Assignee: Panasonic Corporation, Osaka (JP)

( * ) Notice: Subject to any disclaimer, the term of this patent is extended or adjusted under 35 U.S.C. 154(b) by 423 days.

(21) Appl. No.: 12/865,919

(22) PCT Filed: Oct. 22, 2009

(86) PCT No.: PCT/JP2009/005535
§ 371 (c)(1),
(2), (4) Date: Aug. 3, 2010

(87) PCT Pub. No.: WO2010/061520
PCT Pub. Date: Jun. 3, 2010

(65) Prior Publication Data
US 2010/0333022 A1     Dec. 30, 2010

(30) Foreign Application Priority Data
Nov. 25, 2008   (JP) .................................. 2008-300206

(51) Int. Cl.
*G06F 3/00* (2006.01)

(52) U.S. Cl.
USPC ............ 715/708; 715/709; 715/712; 715/713

(58) Field of Classification Search ........... 715/705–714
See application file for complete search history.

(56) References Cited

U.S. PATENT DOCUMENTS

| | | | | |
|---|---|---|---|---|
| 5,774,118 A | * | 6/1998 | Hatakama | 715/707 |
| RE37,431 E | * | 10/2001 | Lanier et al. | 706/58 |
| 7,228,329 B2 | * | 6/2007 | Kaiser | 709/203 |
| 7,861,178 B2 | * | 12/2010 | Lui et al. | 715/762 |
| 2001/0011249 A1 | | 8/2001 | Yanagihara et al. | |

(Continued)

FOREIGN PATENT DOCUMENTS

| | | |
|---|---|---|
| CN | 1758726 | 4/2006 |
| JP | 9-101935 | 4/1997 |

(Continued)

OTHER PUBLICATIONS

International Search Report issued Jan. 26, 2010 in International (PCT) Application No. PCT/JP2009/005535.

(Continued)

*Primary Examiner* — Tadeese Hailu
(74) *Attorney, Agent, or Firm* — Wenderoth, Lind & Ponack, L.L.P.

(57) ABSTRACT

The operation support apparatus includes: an operation load calculation unit (106) which calculates an operation load on a user in performing a selecting operation included in one of operation records, using the selecting operation and a previous selecting operation included in another one of the records, the calculation being performed for each of selecting operations included in the records; a non-thinking operation determination unit (107) which determines, for each selecting operation included in the records, whether or not it is a non-thinking operation that is a randomly-performed operation, by determining that the selecting operation is more likely to be the non-thinking operation when the operation load is smaller; and a target function inference unit (108) and a target function candidate storage unit (109) which provide the user with operation support based on the records of the selecting operations excluding the selecting operation determined as the non-thinking operation.

21 Claims, 27 Drawing Sheets

U.S. PATENT DOCUMENTS

2002/0118220 A1* 8/2002 Lui et al. .................. 345/709
2004/0201867 A1* 10/2004 Katano .................. 358/1.15
2005/0111866 A1  5/2005 Sato

FOREIGN PATENT DOCUMENTS

| JP | 11-31190 | 2/1999 |
| JP | 11-203006 | 7/1999 |
| JP | 11-231998 | 8/1999 |
| JP | 2000-231429 | 8/2000 |
| JP | 2005-153346 | 6/2005 |
| JP | 2006-163988 | 6/2006 |
| JP | 2006-344018 | 12/2006 |
| JP | 2008-84172 | 4/2008 |
| JP | 2008-269119 | 11/2008 |
| WO | 2008/059710 | 5/2008 |

OTHER PUBLICATIONS

Kita Kenji, et al., "Information Retrieval Algorithm", Kyoritsu Shuppan Co., Ltd., pp. 60-63, Jan. 2002 with partial English translation.

* cited by examiner

FIG. 4

| Item Number 401 | Item Name 402 | Up 403 | Down 404 | Enter 405 | Return 406 |
|---|---|---|---|---|---|
| 1 | Playback navigation | 7 | 2 | Playback navigation @1 | ... |
| 2 | Set scheduled recording from program guide | 1 | 3 | Program guide @1 | ... |
| 3 | Check scheduled recording | 2 | 4 | List of recording scheduled @1 | ... |
| 4 | Search program guide | 3 | 5 | Specify search method @1 | ... |
| 5 | Enter G code | 4 | 6 | Scheduled recording using G code @1 | ... |
| 6 | Dubbing | 5 | 7 | Dubbing @1 | ... |
| 7 | Other functions | 6 | 1 | Select function 1_2 @1 | ... |

FIG. 6

| 601 | 602 | 603 | 604 | 605 | 606 | 607 |
|---|---|---|---|---|---|---|
| Operation Number | Operation Time | Screen Name (before operation) | Selected-Status Item (before operation) | Operation | Display Level | Trial Number |
| 1 | 3:00:04 | Television display | None | Select function | 0 | |
| 2 | 3:00:46 | Select function | Playback navigation | Down | 1 | 1 |
| 3 | 3:00:50 | Select function | Set scheduled recording from program guide | Enter | 1 | |
| 4 | 3:00:53 | Program guide | Program on program guide | Down | 2 | |
| 5 | 3:01:08 | Program guide | Program on program guide | Down | 2 | |
| 6 | 3:01:11 | Program guide | Program on program guide | Left | 2 | |
| 7 | 3:01:28 | Select function | Playback navigation | Select function | 1 | |
| 8 | 3:01:33 | Select function | Set scheduled recording from program guide | Down | 1 | 2 |
| 9 | 3:01:41 | Select function | Check scheduled recording | Down | 1 | |
| 10 | 3:01:46 | Select function | Search program guide | Down | 1 | |
| 11 | 3:01:55 | Select function | Enter G code | Down | 1 | |

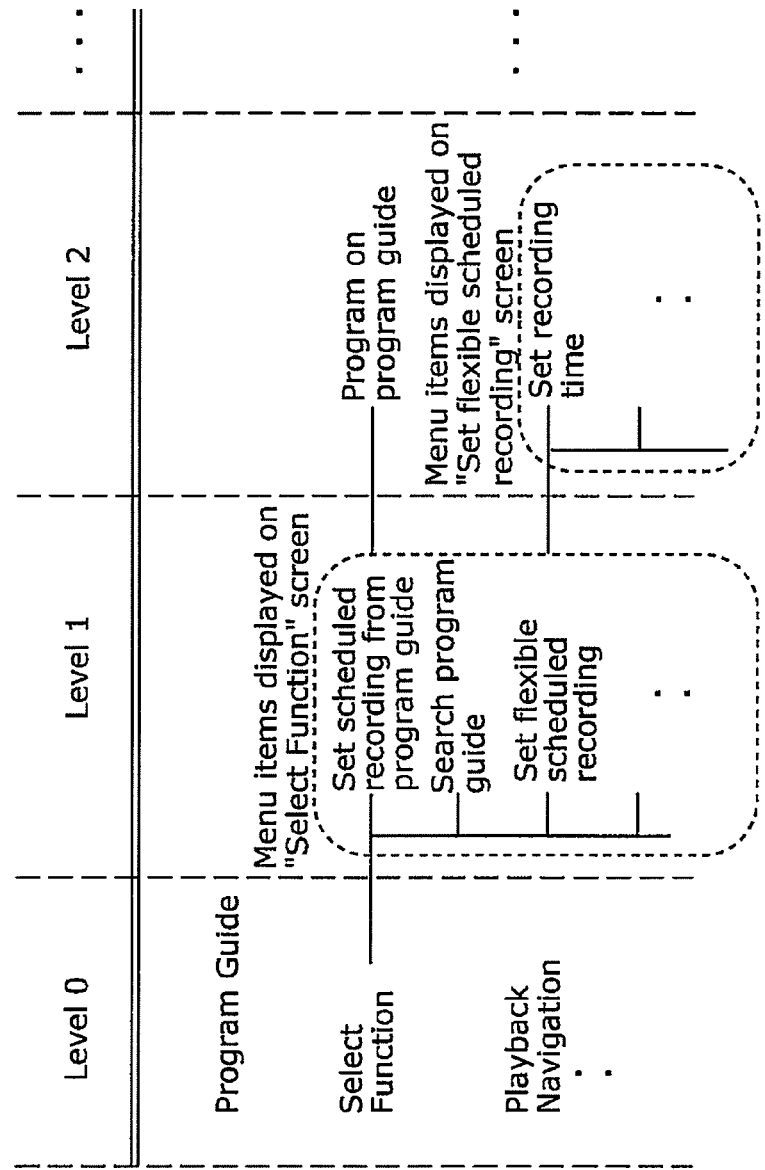

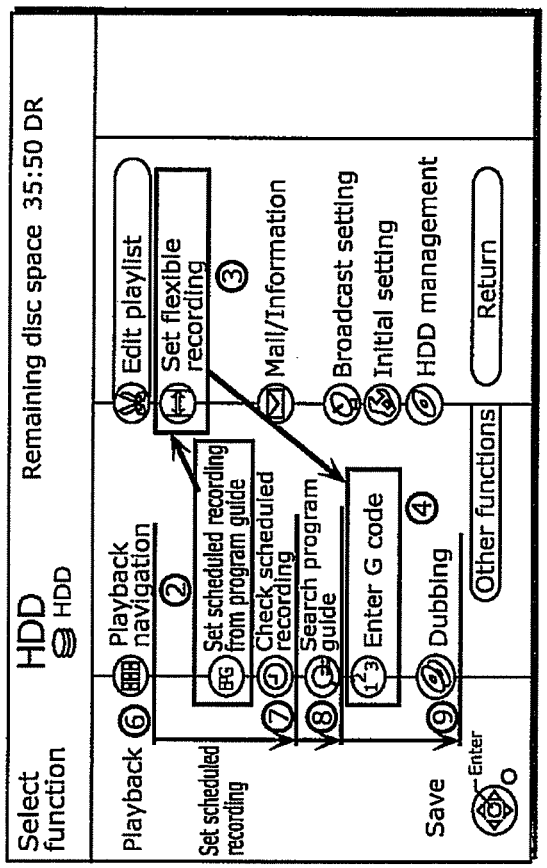

FIG. 10

| 801 Select Number | 802 Selected Item | 903 Screen Initializing Operation | 904 Number of Button Presses | 905 Number of Types of Buttons | 906 Change in Buttons | 907 Operation Load |
|---|---|---|---|---|---|---|
| 1 | Select function | 1 | -1 | 1 | 0 | -1 |
| 2 | Set scheduled recording from program guide | 0 | 1 | 1 | 0 | 2 |
| 3 | Set flexible recording | 0 | 8 | 2 | 0 | 10 |
| 4 | Enter G code | 0 | 3 | 1 | 1 | 5 |
| 5 | Select function | 1 | -1 | 1 | 0 | -1 |
| 6 | Playback navigation | 0 | 0 | 0 | 0 | 0 |
| 7 | Check scheduled recording | 0 | 2 | 1 | 0 | 3 |
| 8 | Search program guide | 0 | 1 | 1 | 0 | 2 |
| 9 | Dubbing | 0 | 2 | 1 | 0 | 3 |
| 10 | Operation support request | 0 | -1 | 1 | 0 | -1 |
| .. | .. | | | | | |

| Select Number | Selected Item |
|---|---|
| 1 | Select function |
| 2 | Menu operation |
| 3 | Select function |
| 4 | Menu operation |
| 5 | Broadcast input |
| 6 | Playback navigation |
| 7 | Program guide |
| 8 | Select function |
| 9 | Operation support request |
| ⋮ | ⋮ |

FIG. 14

| Select Number | Selected Item | Operation load |
|---|---|---|
| 1 | Select function | 1 |
| 2 | Menu operation | 1 |
| 3 | Select function | 1 |
| 4 | Menu operation | 1 |
| 5 | Broadcast input | 1 |
| 6 | Playback navigation | 0 |
| 7 | Program guide | 0 |
| 8 | Select function | 0 |
| 9 | Operation support request | -1 |
| ⋮ | ⋮ | |

| 801 | 802 | 903 | 904 | 905 | 906 | 907 | 1508 | 1509 |
|---|---|---|---|---|---|---|---|---|
| Select Number | Selected Item | Screen Initializing Operation | Number of Button Presses | Number of Types of Buttons | Change in Buttons | Operation Load | Number of Button Presses 2 | Operation Load 2 |
| 1 | Select function | 1 | -1 | 1 | 0 | -1 | -1 | -1 |
| 2 | Set scheduled recording from program guide | 0 | 1 | 1 | 0 | 2 | 1 | 2 |
| 3 | Set flexible recording | 0 | 8 | 2 | 0 | 10 | 8 | 10 |
| 4 | Enter G code | 0 | 3 | 1 | 1 | 5 | 3 | 5 |
| 5 | Select function | 1 | -1 | 1 | 0 | -1 | -1 | -1 |
| 6 | Playback navigation | 0 | 0 | 0 | 0 | 0 | 0 | 0 |
| 7 | Check scheduled recording | 0 | 2 | 1 | 0 | 3 | 1 | 2 |
| 8 | Search program guide | 0 | 1 | 1 | 0 | 2 | 1 | 2 |
| 9 | Dubbing | 0 | 2 | 1 | 0 | 3 | 1 | 2 |
| 10 | Operation support request | 0 | -1 | 1 | 0 | -1 | -1 | -1 |
| ... | | | | | | | | |

FIG. 17

| Function Number | Function Description | Used Words |
|---|---|---|
| 1 | Select television program | Select, Television, Program ... |
| 2 | Select television program from program guide (G guide) | **** |
| 3 | Display subtitles, superimposed messages | **** |
| 4 | Switch signal of video/audio data | **** |
| 5 | Set program viewing restriction | **** |
| 6 | Record currently-broadcast program | **** |
| 7 | Watch data broadcast | **** |
| 8 | Playback MP3 | **** |
| 9 | Set playback method (playback) | **** |
| : | : | : |

| Select Number 2101 | Selected Icon 2102 | Selected Icon Coordinates 2103 | Moving Distance 2104 | Moving Operation Vector 2105 | Cosine Scale 2106 |
|---|---|---|---|---|---|
| 1 | icon1 | (*,*) | — | — | — |
| 2 | icon8 | (*,*) | * | (*,*) | — |
| 3 | icon7 | (*,*) | * | (*,*) | * |
| 4 | icon6 | (*,*) | * | (*,*) | * |
| 5 | iconA | (*,*) | * | (*,*) | * |
| 6 | icon1 | (*,*) | * | (*,*) | * |
| 7 | icon2 | (*,*) | * | (*,*) | * |
| 8 | icon3 | (*,*) | * | (*,*) | * |
| 9 | icon4 | (*,*) | * | (*,*) | * |
| 10 | Operation support request | .. | .. | .. | .. |
| .. | | | | | |

OPERATION SUPPORT APPARATUS AND METHOD OF THE SAME

TECHNICAL FIELD

The present invention relates to operation support apparatuses and methods of the same for use in devices having various functions, such as computers, electronic products, and audio/visual (AV) devices that execute application programs. In particular, the present invention relates to an operation support apparatus and a method of the same which infer a function targeted by a user from the user's operation records and provide the user with support for operation based on the inference result.

BACKGROUND ART

The operation of recent computer application programs, electronic products, and AV devices is increasingly complicated together with the implementation of various functions thereof. This makes operation support important for users who do not know how to operate them. For users who do not know how to achieve a target function, a manual may be provided so that they can find out how to operate the target function by themselves. However, finding the target function using the manual is burdensome and time-consuming for the users. To address this circumstance, there is a technique in which a system infers the user's target function when a user makes a support request, using records of the user's operations performed through a trial-and-error process before the support request has been made. Providing operation support based on the result of the inference enables provision of operation support which is less burdensome for the users.

As described, a technique is proposed for supporting the user's operations based on the user's operation records. For example, there is a help display apparatus which searches for a function highly related to key operation inputs that the user has performed through a trial-and-error process, and presents operating instructions regarding that function (see Patent Literature 1, for example).

This help display apparatus infers the target function using records of operations that the user has performed until just before making an operation support request. This is based on an assumption that the user performs operations related to the target function until just before making the operation support request.

CITATION LIST

Patent Literature

[PTL 1]
Japanese Unexamined Patent Application Publication No. 11-231998

SUMMARY OF INVENTION

Technical Problem

However, the user's actual behavior is that the user first performs operations that the user feels confident about, but then, in the case of failing to access the target function through such operations, the user performs exploratory operations that the user thinks are likely to enable access to the target function. In the case of still failing to access the target function even through such operations, it is observed that the user performs random operations, and lastly, gives up on accessing the target function by himself and makes the operation support request. For example, when the target function is to be achieved through selection of a menu item, the user first selects a menu item which he thinks is highly likely to enable access to the target function, from among multiple menu items. However, in the case where the user cannot access the target function even after selecting several menu items, the user randomly selects unselected menu items.

Prior to the random operations, the user considers the likeliness of unperformed operations enabling access to the target function, ranks the unperformed operations according to the likeliness considered, and performs such operations starting from the top-rank operation. However, in the case where performing highly-ranked operations does not lead the user to the target function, it becomes difficult for the user to rank unperformed operations by considering the likeliness of each operation enabling access to the target function. In such a situation, the user no longer considers the likelihood of each operation enabling access to the target function, and starts performing operations randomly. In performing the operations randomly, the user does not consider the above-mentioned likelihood or performs an operation thinking that the operation is weakly related to the target function. Thus, hereinafter, such a random operation is also referred to as a non-thinking operation.

In the case of using the conventional help display apparatus for such a user behavior, the target function is inferred using operation records that are unrelated to the target function. For this reason, the accuracy of the target function inference deteriorates, resulting in a problem that the user cannot be provided with appropriate operation support.

The present invention, conceived to solve the above problem, aims to provide an operation support apparatus and an operation support method capable of providing the user with appropriate operation support even when the user makes the operation support request after performing a random operation, by presenting the user with candidate target functions that are inferred at high accuracy through identification and deletion of operation records which indicate the random operation.

Solution to Problem

The present invention is based on a principle that in the non-thinking operation that the user performs without considering the likeliness of the operation enabling access to the target function, or in the non-thinking operation that the user randomly performs thinking that the operation is weakly related to the target function, the user does not select an optimal operation through a thinking process but performs an operation that involves a small operation load.

The operation support apparatus according to an aspect of the present invention is an operation support apparatus which provides a user with operation support for operating a device, the operation support apparatus including: an operation record storage unit configured to store records of selecting operations each performed by the user for execution of a function of the device; an operation load calculation unit configured to calculate an operation load on the user in performing a selecting operation included in one of the records stored in the operation record storage unit, using the selecting operation and a previous selecting operation included in another one of the records; a non-thinking operation determination unit configured to determine whether or not the selecting operation included in one of the records stored in the operation record storage unit is a non-thinking operation, by determining that the selecting operation is more likely to be the non-thinking operation when the operation load on the user calculated by the operation load calculation unit is smaller, the non-thinking operation being a randomly-performed operation; and an operation support unit configured to provide the user with the operation support based on the records of the selecting operations excluding the selecting operation determined as the non-thinking operation by the non-thinking operation determination unit.

According to this structure, the operation load is calculated for each selecting operation using the records of the user's selecting operations, and it is determined that a selecting operation involving a small operation load is the non-thinking operation. As a result, the non-thinking operation causing deterioration in the accuracy of the target function inference can be removed to enable the inference of the user's target function. Thus, the target function can be inferred at high accuracy, enabling provision of more appropriate operation support for the user.

It is to be noted that the present invention can be realized not only as an operation support apparatus which includes such characteristic processing units, but also as an operation support method which includes, as steps, the characteristic processing units included in the operation support apparatus. In addition, the present invention can also be realized as a program which causes a computer to execute the characteristic steps included in the operation support method. It is apparent that such a program can be distributed via a recording medium such as a Compact Disc-Read Only Memory (CD-ROM) or a communication network such as the Internet.

Advantageous Effects of Invention

As described above, according to the operation support apparatus according to an aspect of the present invention, it is possible to delete, from the operation records to be used for the target function inference, the non-thinking operation that the user performs without considering the likeliness of the operation enabling access to the target function, or the non-thinking operation that the user performs thinking that the operation is weakly related to the target function. As a result, the target function can be inferred more accurately, enabling provision of appropriate operation support for the user.

BRIEF DESCRIPTION OF DRAWINGS

FIG. 4 shows a data example of screen information stored in a screen information storage unit according to an embodiment of the present invention.

FIG. 6 shows an example of operation record data stored in an operation record storage unit according to an embodiment of the present invention.

FIG. 7 shows an example of menu levels of a Select Function screen according to an embodiment of the present invention.

FIG. 9A shows an example of operation record data stored in an operation record storage unit according to an embodiment of the present invention.

FIG. 9B shows an example of a Select Function screen for explaining the operation records shown in FIG. 9A.

FIG. 10 shows an example of operation record data stored in an operation record storage unit according to an embodiment of the present invention.

FIG. 14 shows an example of operation record data stored in an operation record storage unit according to an embodiment of the present invention.

FIG. 16 shows an example of operation record data stored in an operation record storage unit according to an embodiment of the present invention.

FIG. 17 shows an example of data related to target function candidates stored in a target function candidate storage unit according to an embodiment of the present invention.

FIG. 22 is shows an example of operation record data stored in an operation record storage unit according to the first variation of an embodiment of the present invention.

DESCRIPTION OF EMBODIMENTS

Hereinafter, an embodiment of the present invention is described with reference to the drawings.

In the present embodiment, a description is provided regarding operations for providing a user with operation support when the user operating a recording device using a remote controller (hereinafter referred to as "remote control") is unable to access a target function and makes an operation support request. The operation support is provided by inferring the user's target function from records of selecting operations that the user has performed before making the operation support request for selecting a menu item (an item selectable on a menu screen) and a button (hereinafter referred to as "selection records"). It is to be noted that selecting operations do not include a moving operation such as a cursor movement.

Figure 1:
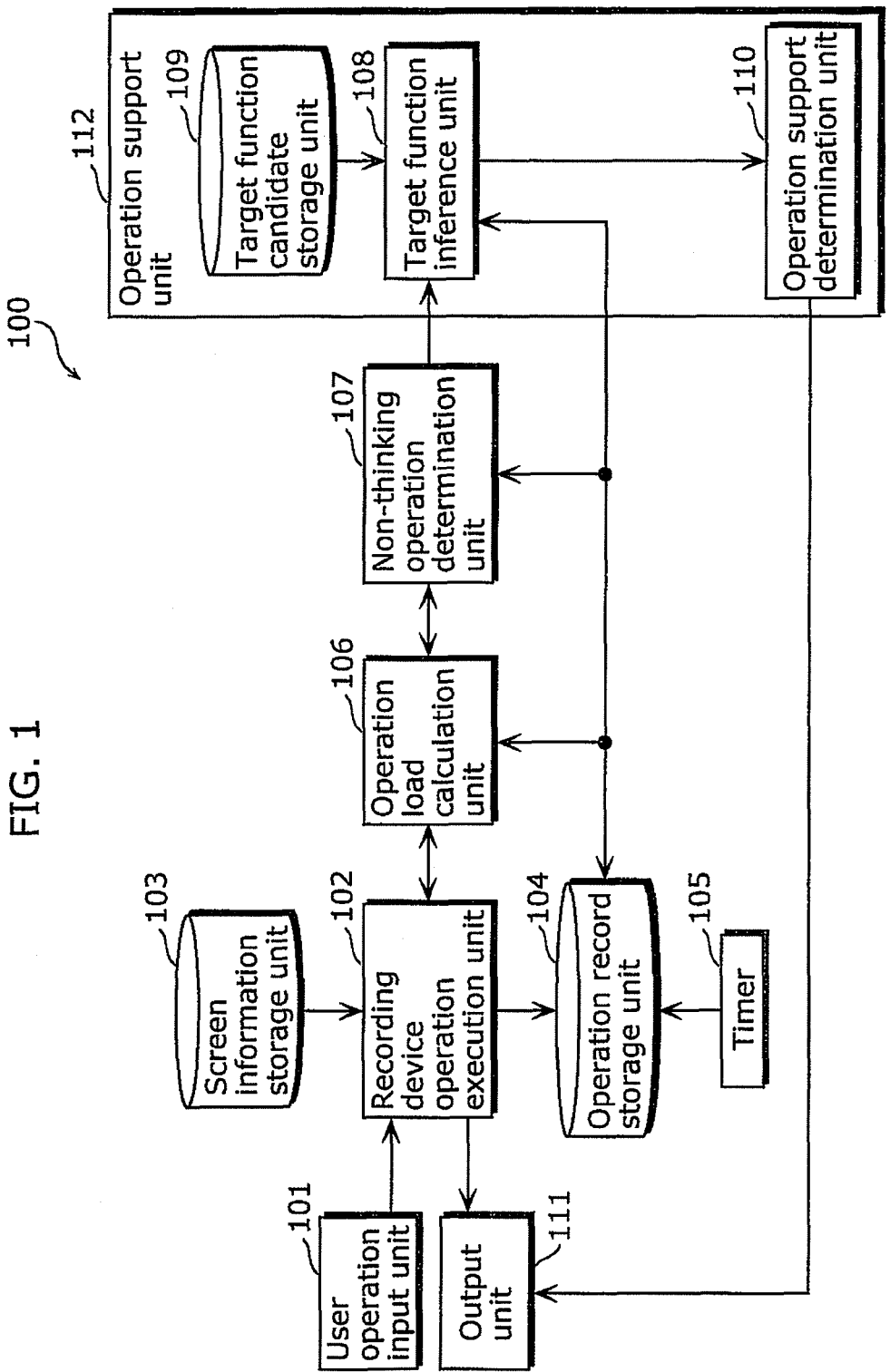
FIG. 1 is a block diagram showing a structure of an operation support apparatus according to an embodiment of the present invention.

FIG. 1 is a block diagram showing a structure of an operation support apparatus according to an embodiment of the present invention.

An operation support apparatus 100 is an apparatus that supports a user for operating a recording device which records a television program.

The operation support apparatus 100 includes a user operation input unit 101, a recording device operation execution unit 102, a screen information storage unit 103, an operation record storage unit 104, a timer 105, and an operation load calculation unit 106. The operation support apparatus 100 further includes a non-thinking operation determination unit 107, an operation support unit 112, and an output unit 111. It is to be noted that the recording device may be provided in the operation support apparatus 100 or may be provided separately from the operation support apparatus 100.

In the functional block diagram shown in FIG. 1, the operation record storage unit 104, the operation load calculation unit 106, the non-thinking operation determination unit 107, and the operation support unit 112 are the essential elements of the present invention. The other elements are preferably included. This is because having the essential elements enables identification and deletion of records of random operations. With this, presenting the user with functions which are inferred as target function candidates at high inference accuracy enables provision of more appropriate operation support for the user.

The user operation input unit 101 is a remote control, a touch panel, or the like, and is a processing unit which receives an operation input that the user performs on the recording device.

The screen information storage unit 103 is a storage device for storing various kinds of screen information, including screen information on an operation screen of the recording device. The screen information on an operation screen of the recording device is information indicating a process to be performed by the recording device or a screen to be displayed in response to an operation input. Specific examples of the screen information are described later.

The recording device operation execution unit 102 is a processing unit which executes an operation of the recording device based on the user's operation input received by the user operation input unit 101. In doing so, the recording device operation execution unit 102 refers to the screen information stored in the screen information storage unit 103 to specify a function to be executed or a screen to be displayed in response to the operation input.

The operation record storage unit 104 is a storage device for storing records of selecting operations each performed by the user for executing a function of the device. More specifically, the operation record storage unit 104 is a storage device for storing operation records each of which associates the operation input received by the user operation input unit 101, including an selecting operation performed for selecting a function of the recording device, with time information and the recording device's status at the time when the operation input was performed.

The timer 105 is a processing unit which measures a current time.

The operation load calculation unit 106 is a processing unit which calculates the load of each operation by the user, using operation records stored in the operation record storage unit 104. More specifically, the operation load calculation unit 106 calculates the operation load on the user in performing a selecting operation included in one of the records stored in the operation record storage unit 104, using the selecting operation and a previous selecting operation stored in another one of the records.

The non-thinking operation determination unit 107 is a processing unit which determines whether or not the user's operation is a randomly-performed operation (non-thinking operation), according to the operation load of each operation. The non-thinking operation determination unit 107 deletes an operation determined as the non-thinking operation from the operation records from which the target function is to be inferred. More specifically, the non-thinking operation determination unit 107 determines whether or not a selecting operation stored in the operation record storage unit 104 is a randomly-performed non-thinking operation, by determining that the selecting operation is more likely to be the non-thinking operation when the operation load on the user calculated by the operation load calculation unit 106 is smaller.

The operation support unit 112 is a processing unit which provides the user with operation support based on the records of the selecting operations excluding the selecting operation determined as the non-thinking operation by the non-thinking operation determination unit 107.

The operation support unit 112 includes a target function inference unit 108, a target function candidate storage unit 109, and an operation support determination unit 110.

The target function candidate storage unit 109 is a storage device for storing information about functions that are candidates of a target function to be inferred (hereinafter such functions are referred to as "target function candidates").

The target function inference unit 108 is a processing unit which infers the user's target function. More specifically, the target function inference unit 108 ranks target function candidates using the operation records from which the non-thinking operation has been deleted by the non-thinking operation determination unit 107 and the information about the target function candidates stored in the target function candidate storage unit 109. The inference by the target function inference unit 108 is that the higher the rank given to a target function candidate, the more likely it is that such a target function candidate is the user's target function.

The operation support determination unit 110 is a processing unit which determines an operation support method suited to the user based on the ranking result of the target function candidates.

The output unit 111 is a processing unit which displays: a result of the operation of the recording device executed by the recording device operation execution unit 102; and the operation support method determined by the operation support determination unit 110. For example, the output unit 111 is a display of a television set. It is to be noted that the output unit that displays the execution result of the operation of the recording device may be provided separately from the output unit that displays the determined operation support method. For example, the execution result of ordinary operations of the recording device may be output from a television screen, whereas the operation support for the user may be output from a mobile phone display.

Figure 2:
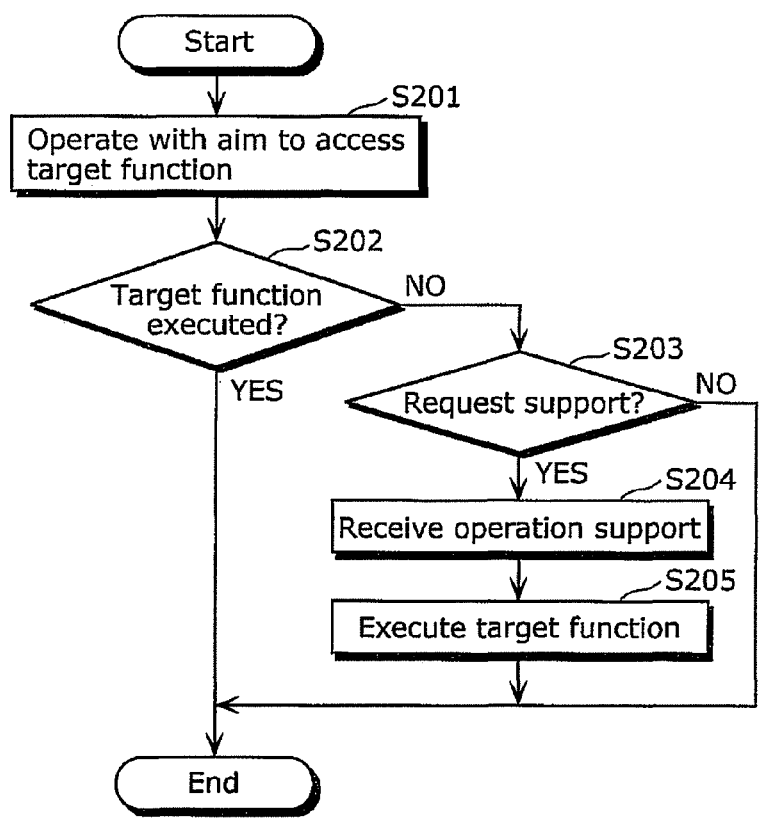
FIG. 2 is a flowchart showing a main operation of a user according to an embodiment of the present invention.
Figure 3:
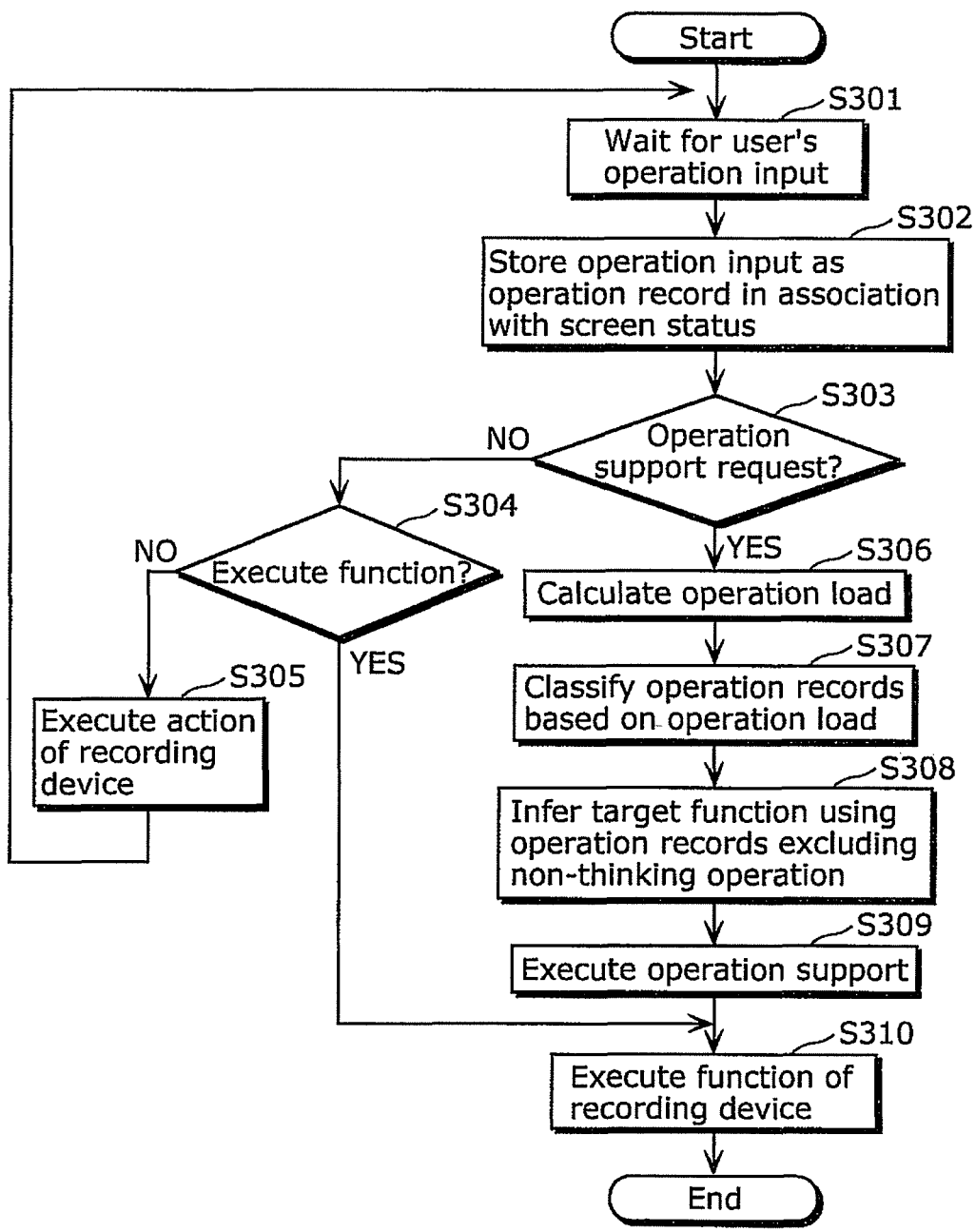
FIG. 3 is a flowchart showing main processing of an operation support apparatus according to an embodiment of the present invention.

The following is a description of an example operation of the operation support apparatus 100 having the above structure. More specifically, the following description assumes that a user operating the recording device is unable to access a target function and makes an operation support request. When the operation support request is made, operational support is provided by inferring the user's target function based on selection records that show menu items and buttons that the user has selected before making the operation support request. The following describes such processing of the operation support. FIG. 2 is a flowchart showing an operation procedure of the user. FIG. 3 is a flowchart showing a processing procedure of the operation support apparatus 100.

Initially, basic actions taken by the user when using the operation support apparatus 100 is described with reference to FIG. 2.

The user operates the operation support apparatus 100 with an aim to access a target function (S201). For example, when the user wishes to schedule-record a program for two hours from 7 pm, the user operates buttons on a remote control (hereinafter referred to as "remote control buttons") or selects a menu item on a menu screen displayed on the output unit 111, so as to set the scheduled recording.

The user can execute the target function without any troubles if the user knows the operation procedure for executing the target function. Even if the user does not know the operation procedure, the user can execute the target function in some cases by selecting a remote control button or a menu item on the output unit 111 which the user thinks is correct. That is to say, the user can execute the target function when the operation procedure which the user expects to be correct for executing the target function matches the operation procedure designed by the system developers for that function. When the user can execute the target function without confusion (YES in S202), the user causes the operation support apparatus 100 to execute the target function without receiving operation support. The user wishing to schedule-record a program as mentioned above can access the target function without confusion if there is a remote control button or a menu item labeled "set recording time".

However, there is a problem as below when the operation procedure that the user expects to be correct for executing the target function is different from the operation procedure designed by the system developers for that function. For example, the user tries various menu items if there is no remote control button or menu item labeled "set recording time" as described above. However, in some cases, the operation support apparatus 100 cannot execute the target function because the user cannot access the target function.

When the operation support apparatus 100 cannot execute the target function (NO in S202), the recording device operation execution unit 102 determines whether or not the user has requested the operation support apparatus 100 to provide operation support (S203). When the user thinks he cannot access the target function by himself, the user requests operation support through an action such as pressing a guide button ("?" button, for example) on the remote control.

When the operation support is requested (YES in S203), the user receives the operation support from the operation support apparatus 100 (S204). For example, the operation support apparatus 100 displays a list of candidates of the user's target function in response to the user's support request. When the user selects the target function from the list, the operation support apparatus 100 displays on the output unit 111 information on a menu item and so on that needs to be selected for accessing the target function.

The user who has learned how to access the target function through the operation support from the operation support determination unit 110 causes the recording device operation execution unit 102 to execute the target function (S205).

On the other hand, if the user cannot execute the target function but does not request the operation support apparatus 100 to provide operation support (NO in S203), the user finishes the operation without executing the target function.

Next, the processing executed by the operation support apparatus 100 is described with main reference to the block diagram in FIG. 1 showing the structure of the operation support apparatus 100 and the flowchart in FIG. 3.

The recording device operation execution unit 102 waits for the user's operation input from the user operation input unit 101 (S301).

The recording device operation execution unit 102 stores the user's operation input received from the user operation input unit 101 in the operation record storage unit 104 as an operation record, in association with the screen information stored in the screen information storage unit 103 (S302).

Figure 5:
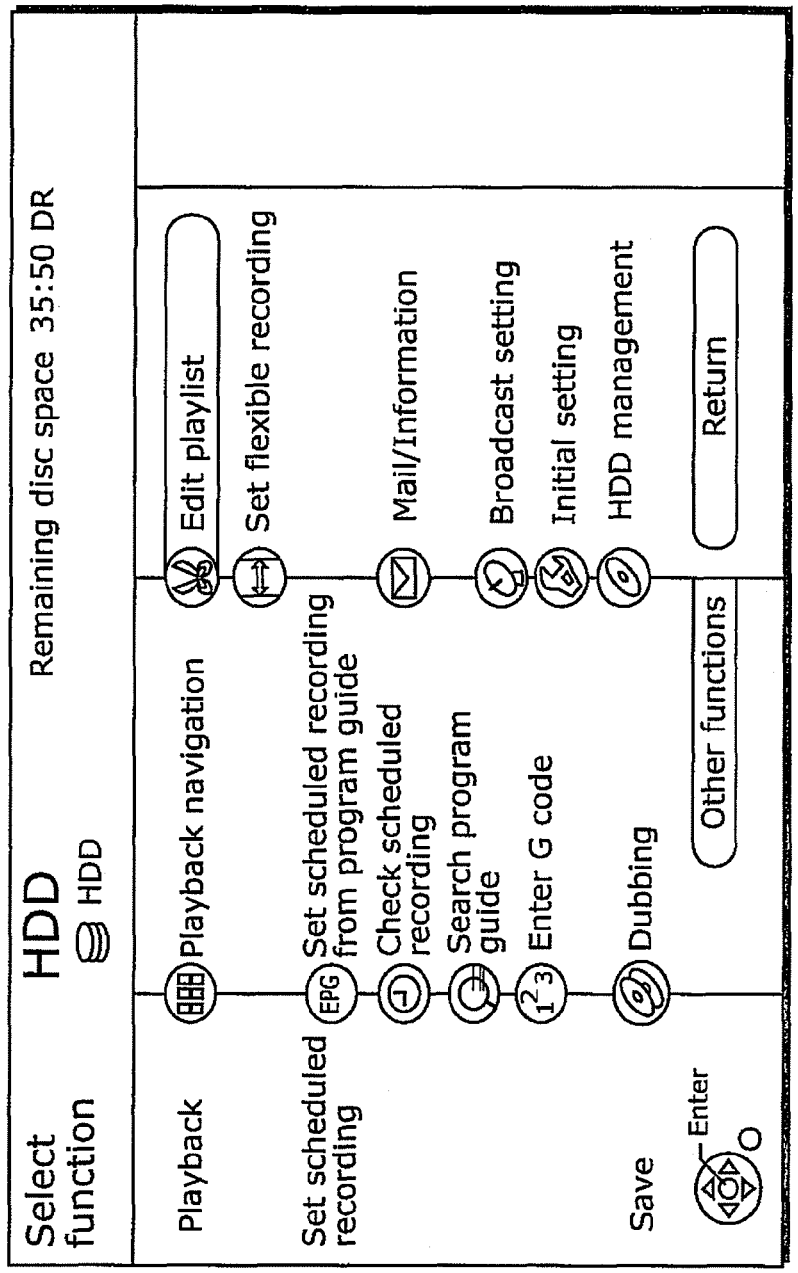
FIG. 5 shows an example screen of a recording device according to an embodiment of the present invention.

Initially, FIG. 4 shows an example of specific data included in the screen information stored in the screen information storage unit 103 regarding a screen named "select function". Here, the "screen name" is a name of a screen displayed when the recording device is operated, and a screen name "select function", for example, is a name given to a menu screen as shown in FIG. 5.

As shown in FIG. 4, the screen information is information including six items 401 to 406. The item 401 shows an item number, representing the position of a menu item. The item 402 shows an item name. The item 403 shows which menu item (i.e., which item number) is placed in a selected status when the "up" button is pressed. Similarly, the item 404 shows which menu item (i.e., which item number) is placed in a selected status when the "down" button is pressed. Specifically, when a menu item having an item name "playback navigation" and the item number "1" is in the selected status, pressing the "up" button places the item numbered "7" in the selected status. This means that a menu item having an item name "other functions" is placed in the selected status. Similarly, when the menu item having the item name "playback navigation" and the item number "1" is in the selected status, pressing the "down" button places a menu item "set scheduled recording from program guide" of the item number "2" in the selected status. As with the items 403 and 404, the item 405 and each item after that indicate which remote control button places which item in the selected status. Pressing a remote control button places an item on another screen in the selected status, and thus the item 405 and each item after that indicate which screen will be displayed when the remote control button is pressed. In addition, if the screen to be displayed when the remote control button is pressed (destination screen) is a menu screen, the item 405 and each item after that also indicate which menu item will be placed in the selected status when the remote control button is pressed. In this data example, the name of the destination screen is indicated before the sign "@", and the item number of the menu item which will be placed in the selected status on the destination screen is indicated after the sign "@". Specifically, when the menu item having the item name "playback navigation" and the item number "1" is in the selected status, pressing the "enter" button on the remote control causes a menu screen named "playback navigation" to be displayed. On this menu screen, the menu item having the item name indicated in the item number "1" will be placed in the selected status.

Next, FIG. 6 shows an example of specific data included in the operation records stored in the operation record storage unit 104. Each operation record includes items 601 to 607. Each record including the items 601 to 607 shows one operation. The item 601 indicates an operation number that is a serial number assigned to each operation. The operation number is reset with predetermined timing, such as when the device is activated. The item 602 indicates a time at which the user has performed an operation. The item 603 indicates a name of a screen displayed before the user's operation. The item 604 indicates a name of a menu item in the selected status before the user's operation (selected-status item). The item 605 indicates the user's operation and a remote control button selected at the time of the user's operation. The item 606 indicates at which menu level the operation indicated in the item 605 has been performed. For example, level 0 is defined as the status in which the screen of the recording device in the activated status is not displayed. Level 1 is defined as the status in which a screen is displayed through pressing of a remote control button at level 0. Furthermore, level 2 is defined as the status in which another screen is displayed through an operation defined on the screen displayed at level 1. FIG. 7 shows an example of menu levels. For example, an operation of pressing a remote control button "select function" is an operation at level 0. An operation of selecting an item "set flexible scheduled recording", which is one of the menu items displayed on the "select function" screen displayed as a result of the previous operation, is an operation at level 1. An operation of selecting an item "set recording time", which is one of the menu items displayed on the "set flexible scheduled recording" screen displayed as a result of the previous operation, is an operation at level 2.

The item 607 indicates a trial number. A trial refers to the user's operations performed before the user performs a function search again by returning to a higher level because descending the menu levels did not lead the user to the target function. The item 607 is a number indicating a break between each trial. In the example of FIG. 6, up to the operation number "6", the user searches for the target function by pressing the arrow keys on the "program guide" screen; however, the user then judges that the target function cannot be accessed from this screen and thus presses the "select function" button to perform the function search again. Therefore, the operations from the operation number "7" are referred to as another trial.

Figure 8:
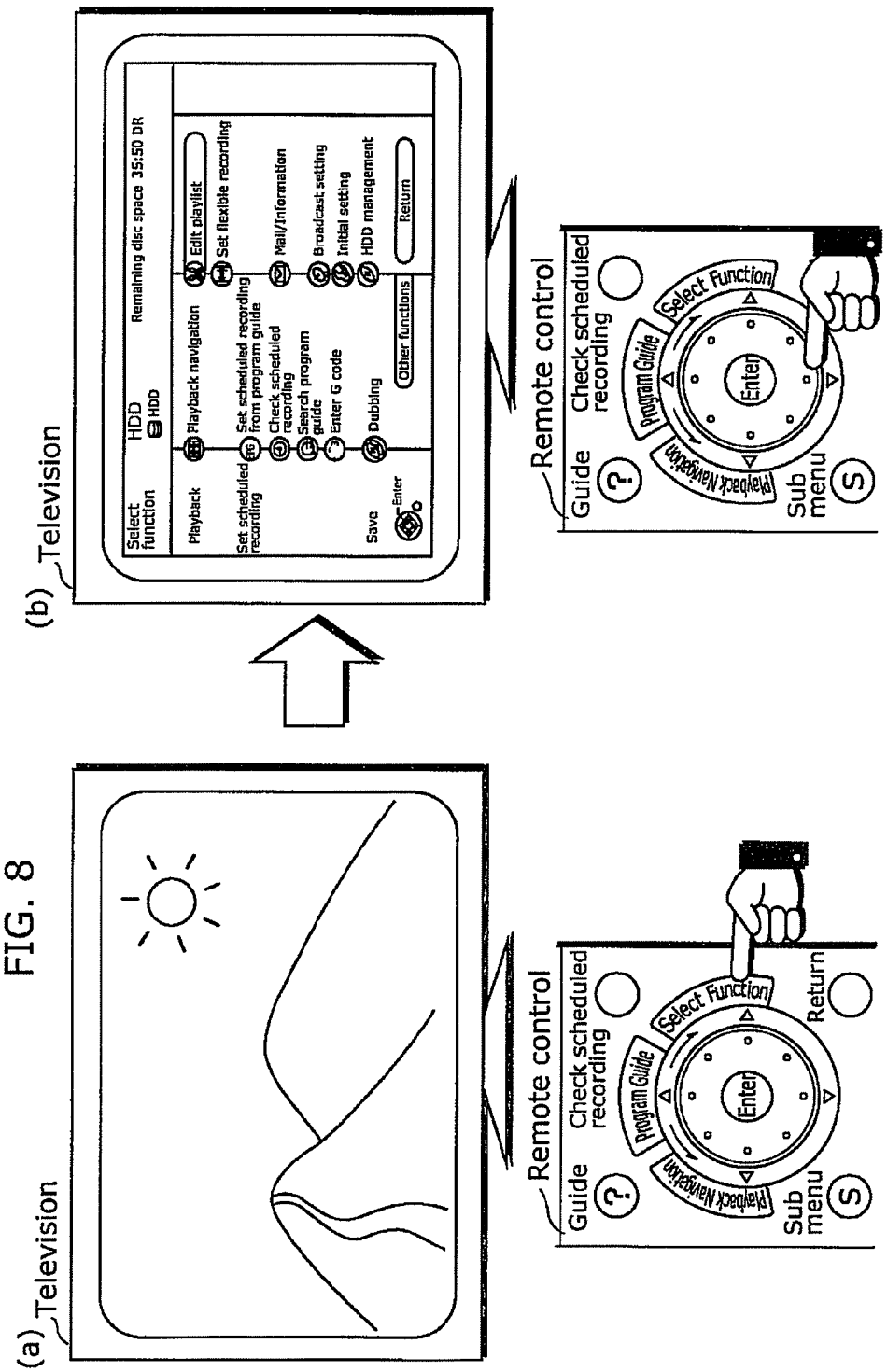
FIG. 8 shows a change in screen corresponding to an operation record according to an embodiment of the present invention.

With reference to FIG. 8, the operations of the operation numbers "1" and "2" in FIG. 6 are described. The operation record of the operation number "1" in FIG. 6 indicates an operation of pressing the "select function" button on the remote control on the "television display" screen as shown in part (a) of FIG. 8. The "television display" screen does not show any screen of the recording device. Therefore, the display level is 0. Furthermore, no operation screen of the recording device is shown on the television screen. Therefore, the item 604 indicates "none" as the selected-status item before the user's operation. As a result of the user's operation of the operation number "1" of pressing the "select function" button on the remote control, the "select function" screen (screen of FIG. 5) is displayed on the television screen as shown in part (b) of FIG. 8. The operation record of the operation number "2" in FIG. 6 shows the user's operation of pressing the "down" button on the remote control while the "select function" screen is displayed as shown in part (b) of FIG. 8. The "select function" screen displayed upon pressing of the "select function" button is a menu screen which shows, as shown in FIG. 5, the menu item "playback navigation" at the top, followed by the menu items "set scheduled recording from program guide", "check scheduled recording", and so on. When the "select function" button is pressed, the top item "playback navigation" is in the selected status. Pressing the "down" button on the remote control places the next item below (i.e., "set scheduled recording from program guide") in the selected status on the menu screen. This is the user's operation of the operation number "2".

FIG. 9A shows operation records obtained by extracting, from the operation records shown in FIG. 6, only the items selected by the user. Each operation record includes items 801 to 803. The item 801 indicates a select number. The item 802 indicates an item selected by the user. This selected item is obtained in the following manner: Using the screen information as shown in FIG. 4, it is determined whether or not the user has selected an item on the screen and whether or not the user has selected an item on a remote control button, i.e., a label assigned to a remote control button. According to the determination result, an appropriate selected item is obtained. For example, the user's selection of the "up" or "down" button of the remote control while the screen showing menu options is displayed is an operation for moving the cursor to a target item. Thus, neither "up" nor "down" is a selected item. When the user moves the cursor to a target item and presses the "enter" button, the recording device operation execution unit 102 obtains, as the selected item, not the "enter" that is the label of the remote control button, but the item selected from the menu. More specifically, the selected-status item "set scheduled recording from program guide" shown in the item 604 is obtained when the "enter" button is pressed in the operation of the operation number "3" in the item 605 of FIG. 6. The item 803 indicates a trial number corresponding to the item 607 of FIG. 6.

In addition to the operation records shown in FIG. 6, the operation records formatted as shown in FIG. 9A may be stored in the operation record storage unit 104.

Referring back to FIG. 3, the recording device operation execution unit 102 determines whether or not the operation input received from the user operation input unit 101 is an operation support request (S303).

If the operation input is not an operation support request (NO in S303), the recording device operation execution unit 102 determines whether or not the operation input is an operation for executing a function (S304).

If the operation input is an operation for executing a function (YES in S304), the recording device operation execution unit 102 executes the function of the recording device (S310). On the other hand, if the operation input is not an operation for executing a function (NO in S304), the recording device operation execution unit 102 executes an action of the recording device (S305). After that, the recording device operation execution unit 102 returns to S301 to wait for the user's operation input.

If the operation input received from the user operation input unit 101 is an operation support request (YES in S303), the operation support apparatus 100 executes below-described processing to extract operation records of operations that the user is thought to have performed through a trial and error process in an attempt to execute the target function.

Furthermore, the operation support apparatus 100 infers the user's target function using the extracted operation records, and performs processing for providing operation support. Here, the operation records of operations that the user is thought to have performed through a trial and error process are extracted in the following manner: For example, an operation that the user is thought to have performed through a trial and error process is searched for in operation records of operations performed for a function that has been executed most recently prior to the operation support request. All the operation records starting from the searched-out operation that the user is thought to have performed through a trial and error process up to the operation of making an operation support request are extracted as the operations that the user is thought to have performed through a trial and error process.

Here, the operations that the user is thought to have performed through a trial and error process are operations which have been performed yet did not lead the user to the target function. For example, the operation records of such operations can be obtained by extracting the operation records of operations performed between the operation support request and the most recent execution of a function prior to the operation support request.

That is to say, the operation load calculation unit 106 calculates the user's operation load using the operation records stored in the operation record storage unit 104 and the screen information stored in the screen information storage unit 103 (S306).

The operation target in the present embodiment is the recording device operated with the remote control, and the selecting action includes selection of a menu item on the screen and selection of a remote control button. Both selections are actions involving pressing of a remote control button, but since the selection target is different, the method of calculating the operation load is also different. Hereinafter, a method of calculating the operation load involved in selection of a menu item using the remote control is described first, and a method of calculating the operation load involved in selection of a remote control button is described next.

First, a method of calculating the operation load involved in selection of a menu item using the remote control is described. Described is a method of calculating the user's operation load in performing the operations shown in FIGS. 9A and 9B on the screen shown in FIG. 5 (hereinafter simply referred to as "Select Function screen"), for example. FIG. 9A shows operation record examples, and FIG. 9B shows an example of the Select Function screen for explaining the operation records shown in FIG. 9A. The numbers on the Select Function screen shown in FIG. 9B correspond to the select numbers of the operation records shown in FIG. 9A and indicate the positions of the selected items on the Select Function screen. The operation records shown in FIG. 9A include such operation records as below. Specifically, the user selects an item on the Select Function screen, but the screen displayed as a result of the item selection shows no items that the user desires. Therefore, the user returns to the Select Function screen by pressing the "return" button or the like, and selects another item. The operation records shown in FIG. 9A are records of such operations repeated. However, pressing the Select Function button of the select number "5" is an operation to display the Select Function screen in its initial status.

The operation load calculation unit 106 quantifies the operation load by calculating values of all items of data as shown in FIG. 10 using information included in the operation records stored in the operation record storage unit 104, and stores the operation load in the operation record storage unit 104.

The data shown in FIG. 10 includes items 801, 802, and 903 to 907. The items 801 and 802 are the same as the items 801 and 802 shown in FIG. 9A.

The item 903 is an item indicating a screen initializing operation, and indicates 1 when an operation for initializing the screen is performed and indicates 0 when other operations are performed. It is to be noted that the item in the selected status when the operation for initializing the screen is performed is usually the item located at the top of the screen.

The item 904 indicates the number of times the remote control buttons are pressed during an operation of selecting, when a previously-selected item is in the selected status, an item of the next select number (hereinafter referred to as "selected-item changing operation"). It is to be noted that the number of times the remote control buttons are pressed does not include the number of times the "enter" button, used for selecting an item, is pressed. For example, when the "select function" button of the select number "1" is pressed, the screen shown in FIG. 5 is displayed and the item "playback navigation" is in the selected status. In this state, to select the item "set scheduled recording from program guide" of the select number "2", it is necessary to press the "down" button once, and thus the item 904 of the operation number "2" indicates 1. Likewise, it is indicated for the select number "3" that by pressing the remote control button eight times from the item "set scheduled recording from program guide" of the select number "2", the item "set flexible recording" is reached.

Here, the number of times the remote control buttons are pressed does not include the number of times the "enter" button is pressed; however, the number of times the "enter" button is pressed may be included.

When a remote control button is selected as a selected item rather than for changing the selected-status item on a menu screen, such selection of the remote control button needs to be differentiated from the others. Thus, in such a case, the value of the item 904 is set to −1. The operation of selecting a remote control button as a selected item is, for example, an operation of pressing the "select function" button to display the Select Function screen. It is also an operation of pressing the "play" button to play back contents.

The item 905 indicates the number of types of remote control buttons pressed during the selected-item changing operation. For example, when the selected-item changing operation is performed only with the "down" button on the remote control, the number of types of buttons indicated in the item 905 is 1. Furthermore, the number of types of buttons is 2 when the user becomes confused during the selected-item changing operation and presses the "up" and "down" buttons to place items above and below in the selected status, for example. For example, by pressing the "down" button six times from the item "set scheduled recording from program guide" of the select number "2", the item "set flexible recording" of the select number "3" is placed in the selected status. However, because the user was confused as to which item to select and changed the selected-item changing direction after pressing the "up" button once, the number of button presses required for the selected-item changing operation was 8.

The item 906 indicates whether or not there is a change in button type between the last-pressed button in the previous selected-item changing operation and the first-pressed button in the current selected-item changing operation. The value of the item 906 is 1 when there is a change and 0 when there is no change. This is based on the idea that even with the action of pressing a button once, for example, pressing "down" in the previous operation and then pressing "up" in the following operation involves a larger operation load than in pressing "down" in the previous operation and then pressing "down" in the following operation. It is to be noted that the button referred to here does not include the "enter" button.

The item 907 indicates the result of the operation load calculation using the information indicated in the items 904 to 906. In this example, the operation load is quantified simply by adding up the values of all the items (items 904 to 906); however, processing such as weighting may be performed. As in the item 904 described above, the operation load is set to −1 when a remote control button is selected as a selected item, so as to differentiate such selection from selection of a remote control button for operating a menu screen.

Figure 11:
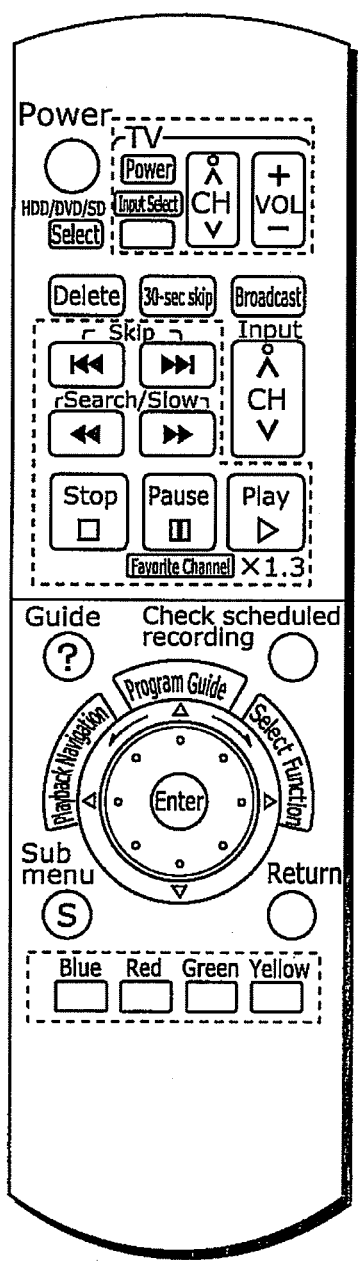
FIG. 11 shows an example of a design of a remote control according to an embodiment of the present invention.
Figure 12:
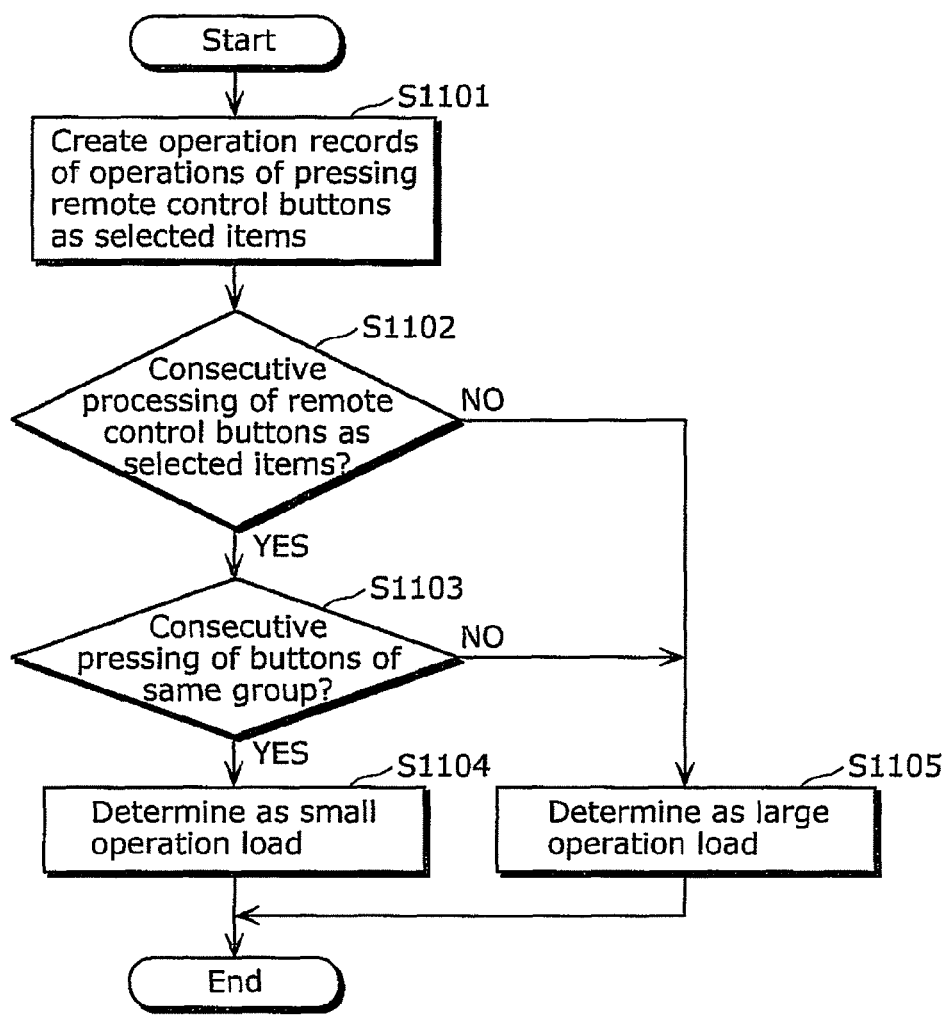
FIG. 12 is a flowchart showing processing of an operation load calculation unit according to an embodiment of the present invention.

Next, with reference to the flowchart shown in FIG. 12, a method of calculating the user's operation load in performing a selecting operation on the remote control buttons using a remote control shown in FIG. 11 is described. Here, unlike the operation load involved in operating the menu screen as described above, the operation load involved in operating the remote control is expressed in two values indicating whether the operation load is large or not.

Figure 13:
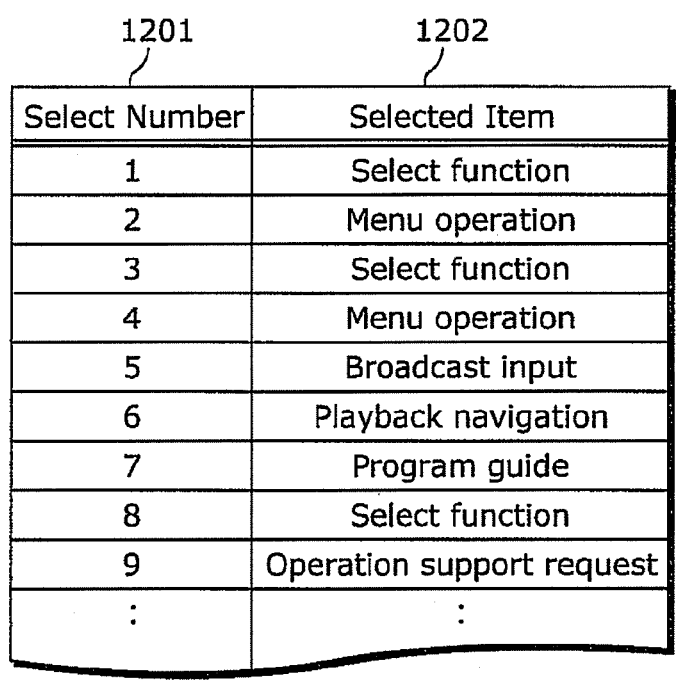
FIG. 13 shows an example of operation record data stored in an operation record storage unit according to an embodiment of the present invention.

The operation load calculation unit 106 extracts from the operation records as shown in FIG. 6 the user's operations of pressing remote control buttons as selected items, so as to create remote control operation records as shown in FIG. 13 (S1101). Each operation record includes items 1201 and 1202. The item 1201 indicates a select number. The item 1202 indicates a selected item. The item 1202 indicates a label of a remote control button as a selected item. The operation load calculation unit 106 determines whether or not current operation(s) is screen operation(s), based on the screen information and the type of the remote control button. In the case of determining that the current operation(s) is screen operation(s), operation record(s) of such operation(s) is collectively recorded as a "menu operation" as indicated in the select numbers "2" and "4". More specifically, the operation load calculation unit 106 determines the operation(s) as menu operation(s) when a button such as "up", "down", "left", "right", "enter", or "return" is pressed on the Select Function screen.

For each of the selected items included in the remote control operation records, the operation load calculation unit 106 determines whether or not it is an item selected through consecutive pressing of remote control buttons as selected items (S1102). More specifically, it is determined that a selected item which is the subject of this determination has been selected through consecutive pressing of remote control buttons in the case where the selected item follows or is followed by a selected item other than "menu operation" and "operation support request". For example, in the case of the remote control operation records shown in FIG. 13, it is determined that the selected items of the select numbers "5" to "8" have been selected through consecutive pressing of remote control buttons.

In the case of determining that the selected item which is the subject of this determination is not an item selected through consecutive pressing of remote control buttons as selected items (NO in S1102), the operation load calculation unit 106 determines that the operation load of the selected item is large (S1105). On the other hand, in the case of determining that the subject item is an item selected through consecutive pressing of remote control buttons as selected items (YES in S1102), the processing proceeds to S1103.

The operation load calculation unit 106 determines whether or not the selected item which is the subject of this determination is an item selected through consecutive pressing of remote control buttons which belong to the same group (S1103). More specifically, the operation load calculation unit 106 determines whether or not the subject item is an item selected through pressing of a button which belongs to the same group as a button pressed for selecting an item preceding or following the subject item. Here, the buttons of the same group may be predetermined by the system developers or automatically determined based on the number, shape, color, and layout of the buttons. For example, three or more buttons having the same shape and positioned within a certain distance may be defined as belonging to the same group. In the case of applying such a definition to the remote control shown in FIG. 11, the "playback navigation" button, the "program guide" button, and the "select function" button are determined as belonging to the same group, for example. Furthermore, the "blue" button, the "red" button, the "green" button, and the "yellow" button are determined as belonging to the same group. Moreover, the "stop" button, the "pause" button, and the "play" button, and so on are determined as belonging to the same group.

Through this determination step, in the case of the remote control operation records shown in FIG. 13, for example, the selected items of the select numbers "6" to "8" are determined as items selected through consecutive pressing of buttons that belong to the same group. Here, in the case of determining that the subject item is not an item selected through consecutive pressing of buttons which belong to the same group (NO in S1103), the operation load calculation unit 106 determines that the operation load of the subject item is large (S1105). On the other hand, in the case of determining that the subject item is an item selected through consecutive pressing of buttons which belong to the same group (YES in S1103), the operation load calculation unit 106 determines that the operation load of the subject item is small (S1104).

FIG. 14 shows the result of the above processing, i.e., the result of determining the operation loads of the operations included in the remote control operation records shown in FIG. 13. An item 1303 indicates the operation load, indicating 1 when the operation load is determined as large and 0 when the operation load is determined as small. Furthermore, it indicates −1 when the user has made an operation support request by pressing a guide button on the remote control, so as to differentiate such an operation from the other operations.

Referring back to FIG. 3, the non-thinking operation determination unit 107 classifies the operation records (S307) using the operation load of each operation calculated in the operation load calculation processing (S306). The purpose of the classification is to delete, from the operation records to be used for the target function inference, the non-thinking operation that the user performs without considering the likeliness of the operation enabling access to the target function, or the non-thinking operation that the user performs thinking that the operation is weakly related to the target function, as described above. Therefore, the non-thinking operation determination unit 107 classifies the operation records by determining whether or not the operations are the non-thinking operations.

Figure 15:
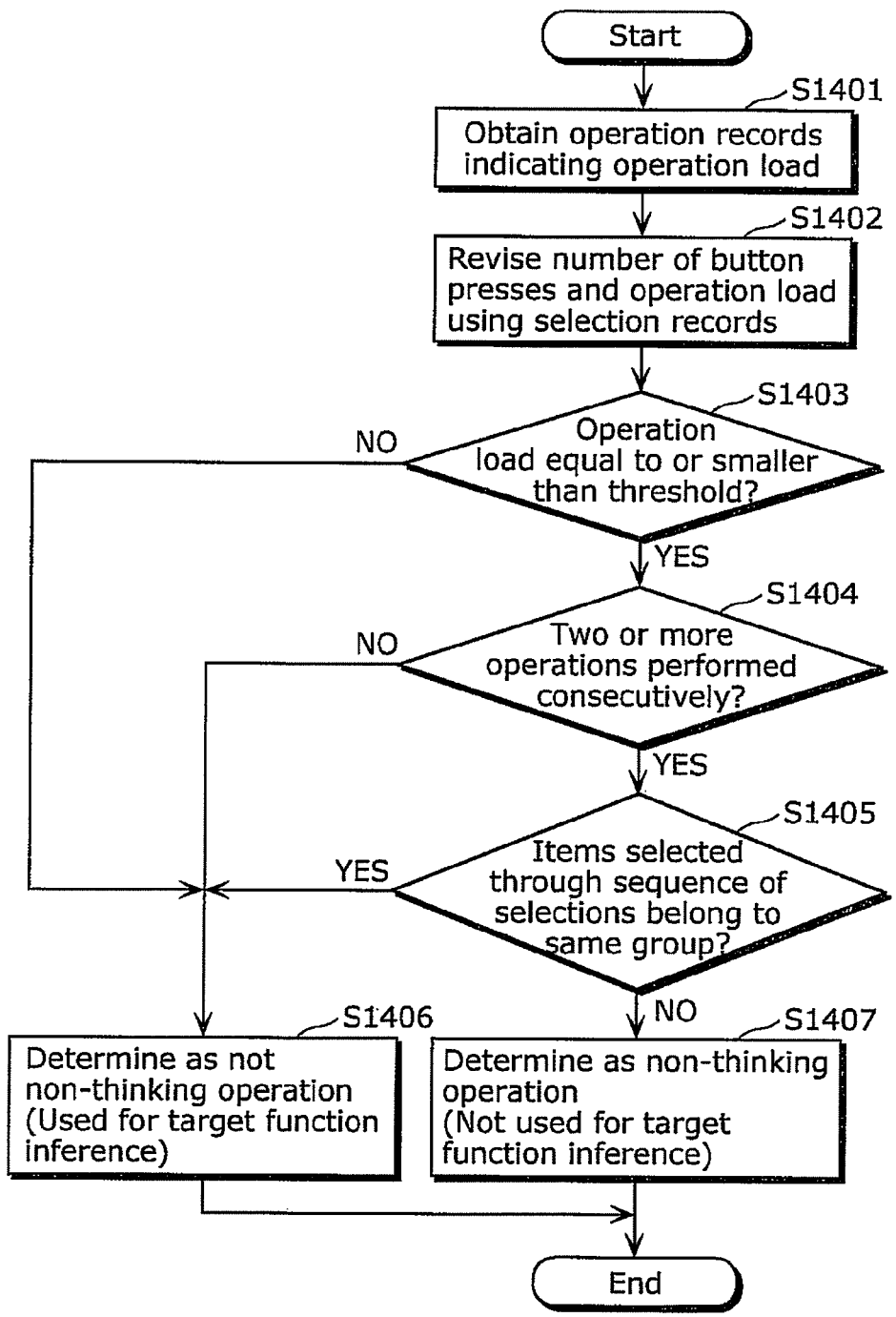
FIG. 15 is a flowchart showing processing of a non-thinking operation determination unit according to an embodiment of the present invention.

FIG. 15 shows a flowchart of the processing, performed by the non-thinking operation determination unit 107, of classifying the operation records of selecting menu items using the remote control (S307).

The non-thinking operation determination unit 107 obtains the data shown in FIG. 10, for example (S1401), which has been calculated in the operation load calculation processing (S306).

The non-thinking operation determination unit 107 revises the number of button presses and the operation load that are included in the obtained data shown in FIG. 10, using the operation records shown in FIG. 6 (S1402). More specifically, the non-thinking operation determination unit 107 disregards a selected item which has been selected a certain number of times or more in the past among the operation records to be used for the target function inference, so as to calculate the number of button presses necessary for each selected-item changing operation. For example, in FIG. 10, a shift from the item "playback navigation" of the select number "6" to the item "check scheduled recording" of the select number "7" requires two button presses. However, the item "set scheduled recording from program guide" between the item "playback navigation" and the item "check scheduled recording" in FIG. 6 has already been selected, as indicated with the select number "2" in FIG. 10. Thus, the item "set scheduled recording from program guide" is disregarded to calculate the number of button presses necessary for a shift from "playback navigation" to "check scheduled recording". Furthermore, the operation load is also revised according to the revised number of button presses. This is to disregard the previously-selected item because it is unlikely that the previously-selected item is re-selected.

FIG. 16 shows an example of the data of FIG. 10 added with the result of reflecting the above revision. The data shown in FIG. 16 is obtained by adding items 1508 and 1509 to the data shown in FIG. 10. The item 1508 indicates the number of button presses revised from the number of button presses indicated in the item 904. The item 1509 indicates an operation load revised from the operation load indicated in the item 907.

The non-thinking operation determination unit 107 performs below-described processing on each operation having the revised operation load, so as to determine whether or not the operation is the non-thinking operation.

Specifically, the non-thinking operation determination unit 107 compares each operation load reflecting the above revision, with a threshold (S1403). When the operation load of the operation which is the subject of this determination is larger than the threshold (NO in S1403), the non-thinking operation determination unit 107 determines that the subject operation is an operation involving a thought and is thus not the non-thinking operation (S1406).

On the other hand, when the operation load of the subject operation is equal to or smaller than the threshold (YES in S1403), the processing proceeds to S1404. The non-thinking operation determination unit 107 obtains the values of the operation loads of operations preceding and following the subject operation, so as to find out which one of the preceding and following operations is an operation involving an operation load equal to or smaller than the threshold (S1404). This determines whether or not two or more operations involving an operation load equal to or smaller than the threshold are consecutively performed. When two or more operations involving an operation load equal to or smaller than the threshold are not consecutively performed (NO in S1404), the non-thinking operation determination unit 107 determines that the subject operation is an operation involving a thought and is thus not the non-thinking operation (S1406). When two or more operations involving an operation load equal to or smaller than the threshold are consecutively performed (YES in S1404), the processing proceeds to S1405.

The processing in S1404 does not have to be performed for each operation. In other words, it may be determined for all the operations collectively whether or not the operation loads thereof are equal to or smaller than the threshold. Using the determination result, the non-thinking operation determination unit 107 may extract consecutively-performed two or more operations involving an operation load equal to or smaller than the threshold, and perform processing of S1405 on the operation records of the consecutively-performed two or more operations. Furthermore, although it is described above that the consecutive number used for the determination in S1404 is two, another number may be used. For example, when the consecutive number used for the determination is five, the processing proceeds to S1406 even when operations involving an operation load equal to or smaller than the threshold are consecutively performed four times, and it is determined that the subject operation is not the non-thinking operation.

The non-thinking operation determination unit 107 determines whether or not the sequence of consecutively-performed operations involving an operation load equal to or smaller than the threshold and extracted in S1404 is a sequence of selections of items that belong to the same group (S1405).

Here, the sequence of selections of items that belong to the same group means selections of a set of similar menu items determined based on a matching degree, similarity, or layout of words included in the menu items, for example. For example, since the items "broadcast setting" and "initial setting" on the Select Function screen of FIG. 5 both include the word "setting" (implying that the semantic similarity between the words included in these menu items is high), they may be regarded as belonging to the same group. Furthermore, from the viewpoint of the layout, the items "set scheduled recording from program guide", "check scheduled recording", "search program guide", and "enter G code" that are classified into the item "set scheduled recording" may be regarded as belonging to the same group. Moreover, the items may be grouped using information such as a menu start position, or the type, size, or color of the font. For example, menu items located at the same horizontal position may be regarded as belonging to the same group, and menu items in the same font size or font color may also be regarded as belonging to the same group.

The non-thinking operation determination unit 107 compares such defined menu item groups and the sequence of operations extracted in S1404. According to the comparison result, the non-thinking operation determination unit 107 determines whether or not the items selected through the sequence of operations belong to one group (S1405). When the items selected through the sequence of operations belong to one group (YES in S1405), the non-thinking operation determination unit 107 determines that the operation which is the subject of this determination is not the non-thinking operation (S1406). On the other hand, when the items selected through the sequence of operations do not belong to one group (NO in S1405); that is, when the operations are performed to select items of different groups, the non-thinking operation determination unit 107 determines that the subject operation is the non-thinking operation (S1407).

In the case where the menu structure is such that similar menu items are positioned close to each other, the user might consecutively perform operations that involve a small operation load yet are not the non-thinking operations. Therefore, it is necessary to determine that an operation is not the non-thinking operation when operations involving a small operation load are consecutively performed to select similar menu items. The determination in S1405 is based on the above-described idea, in addition to the basic idea that an operation is the non-thinking operation when operations involving a small operation load are consecutively performed. Furthermore, the determination in S1405 also involves determination that an operation is the non-thinking operation when operations involving a small operation load are consecutively performed to select items that belong to different groups.

As another determination method based on this idea, there is a method of determining whether or not an operation is the non-thinking operation based on the similarity between selected items included in the selection records. More specifically, a semantic similarity between selected items indicated in the selection records of operations not involving an operation load equal to or smaller than the threshold and thus not determined as the non-thinking operation in S1403 and each item selected through the operation sequence extracted in S1404 is compared with a threshold. The operation performed for selecting the item whose semantic similarity is equal to or greater than the threshold is not determined as the non-thinking operation. More specifically, words included in selected items of selection records of operations not determined as the non-thinking operation are extracted (the set of extracted words is referred to as a word set 1). Similarly, words included in selected items of operation records extracted in S1404 are extracted (the set of extracted words is referred to as a word set 2). Then, a term-document matrix is created from a text corpus like a manual, for example. Furthermore, each word is represented as a vector (Non Patent Literature: KITA et al., Joho Kensaku Algorithm (Information Retrieval Algorithm), Kyoritsu Publications, pp. 60-63), and a word vector included in the word set 1 and a word vector included in the word set 2 are added. With this, a vector corresponding to the word set 1 and a vector corresponding to the word set 2 are created and compared with one another, so as to calculate the semantic similarity.

Through the above processing, in the operation record data shown in FIG. 16, the operations of the select numbers "6" to "9" are determined as the non-thinking operations given that the threshold in S1403 is two.

It is to be noted that the operation load of each operation included in the operation records performed to select a remote control button is already binarized. Therefore, the classification in S306 is used as it is, and an operation determined as involving a small operation load is determined as the non-thinking operation. In the case of the operation record data shown in FIG. 14, for example, the operations of the select numbers "6" to "8" are determined as the non-thinking operations.

Referring back to FIG. 3, the target function inference unit 108 ranks each function stored in the target function candidate storage unit 109, using the selection records stored in the operation record storage unit 104 excluding the selection records of the non-thinking operations. With this, the target function inference is performed (S308).

FIG. 17 shows a specific example of data related to the target function candidates stored in the target function candidate storage unit 109. This data includes items 1601 to 1603. The item 1601 indicates a number assigned to each function. The item 1602 indicates a description of each function, and this function description is a sentence briefly describing each function as in the table of contents of a manual. The item 1603 indicates words used for explaining each function in the manual. The words indicated in the item 1603 are obtained through a morphological analysis on a text document of the manual. For example, the words are of a particular word class such as noun, verb, or adverb.

The target function inference unit 108 extracts, from the operation records classified by the non-thinking operation determination unit 107, the operation records of operations that are not the non-thinking operations and are to be used for the target function inference. The target function inference unit 108 further extracts words used in selected items. This extraction is performed through a morphological analysis as above.

Figure 18:
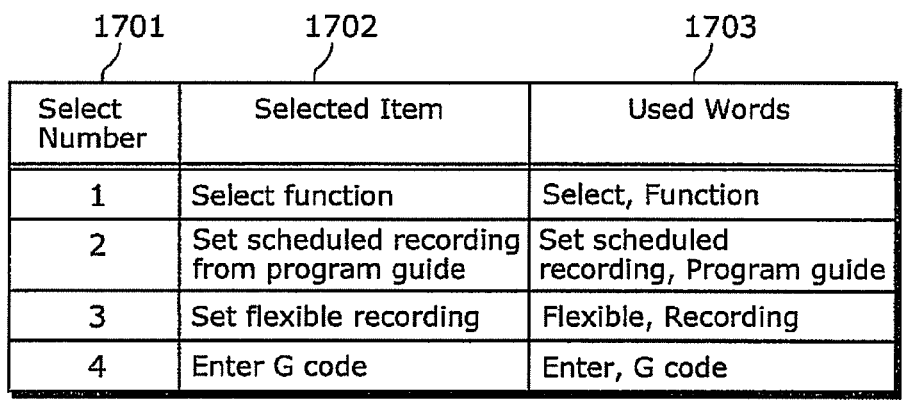
FIG. 18 shows an example of data used for target function inference according to an embodiment of the present invention.

FIG. 18 shows an example of data showing: selected items extracted from the operation records shown in FIG. 16 to be used for the target function inference; and used words extracted from such selected items. This data includes items 1701 to 1703. The items 1701 and 1702 correspond to the items 801 and 802 shown in FIG. 9A. The item 1703 indicates words used in the selected items shown in the item 1702. Since the selected item "select function" of the select number "5" in the operation records shown in FIG. 16 is a screen initializing operation and is followed by a non-thinking operation, this selected item is not used for the target function inference.

The target function inference unit 108 calculates the similarity between each of the functions stored in the target function candidate storage unit 109 and each of the selected items extracted for use in the target function inference, so as to rank each function. The similarity between each function and each item selected by the user is calculated based on the similarity between words used for describing the function and words used for the selected item. The simplest way is to count the number of common words and calculate a similarity which increases with increase in the number of the common words. Alternatively, with each function treated as a set of documents, a term-document matrix is created from the set of documents to represent each function as a vector and to represent each selected item as a search query vector. It is also possible to employ a method of calculating the similarity between each function and each selected item represented as vectors.

When the similarity is greater, it is inferred that the function is more likely to be the user's target function. Thus, this similarity is hereinafter referred to as an inference score.

The operation support determination unit 110 determines an operation support method using the functions ranked by the target function inference unit 108, and outputs the determined operation support method to the output unit 111 (S309). The output unit 111 may be a terminal such as a television set which displays an operation screen of the recording device, or a terminal, such as a mobile phone, different from the terminal which displays an operation screen of the recording device.

Figure 19A:
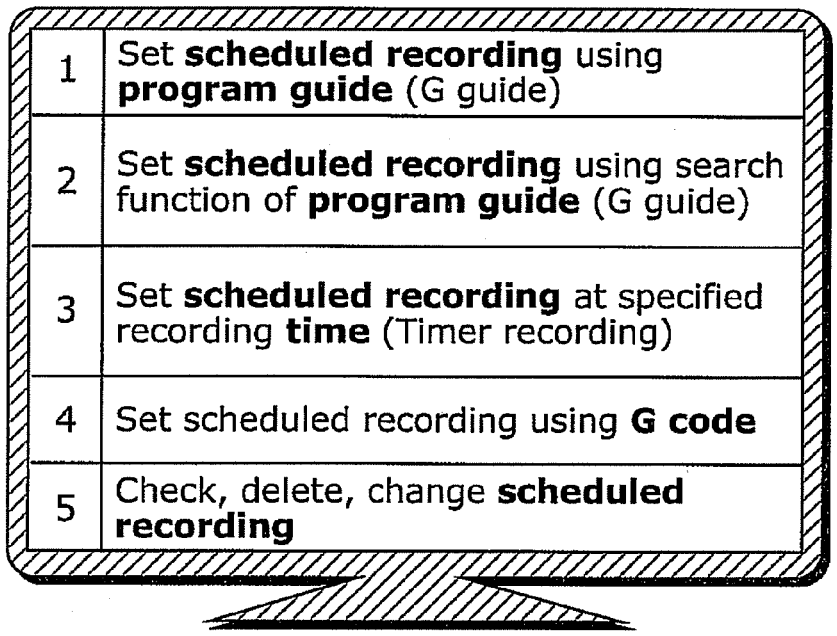
FIG. 19A shows an example of a screen displayed as part of operation support according to an embodiment of the present invention.
Figure 19B:
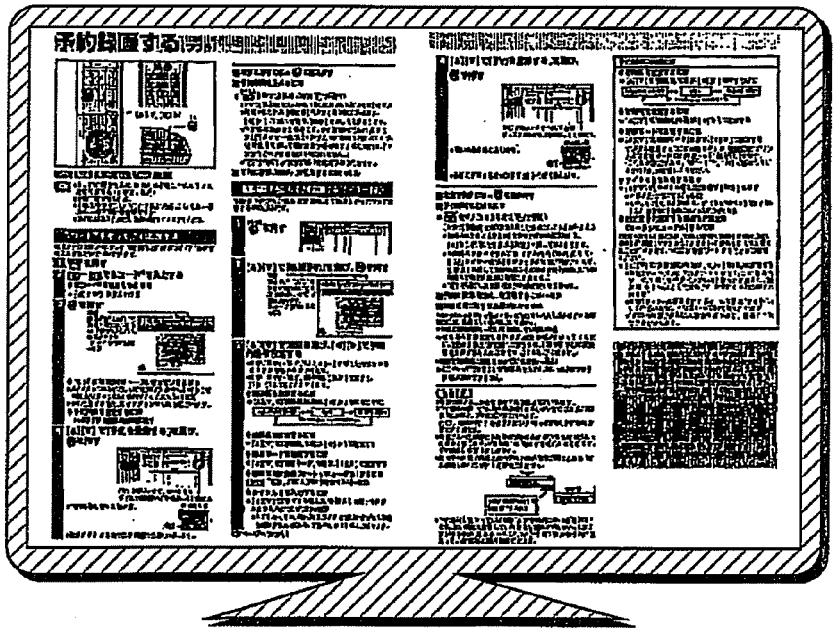
FIG. 19B shows an example of a screen displayed as part of operation support according to an embodiment of the present invention.
Figure 19C:
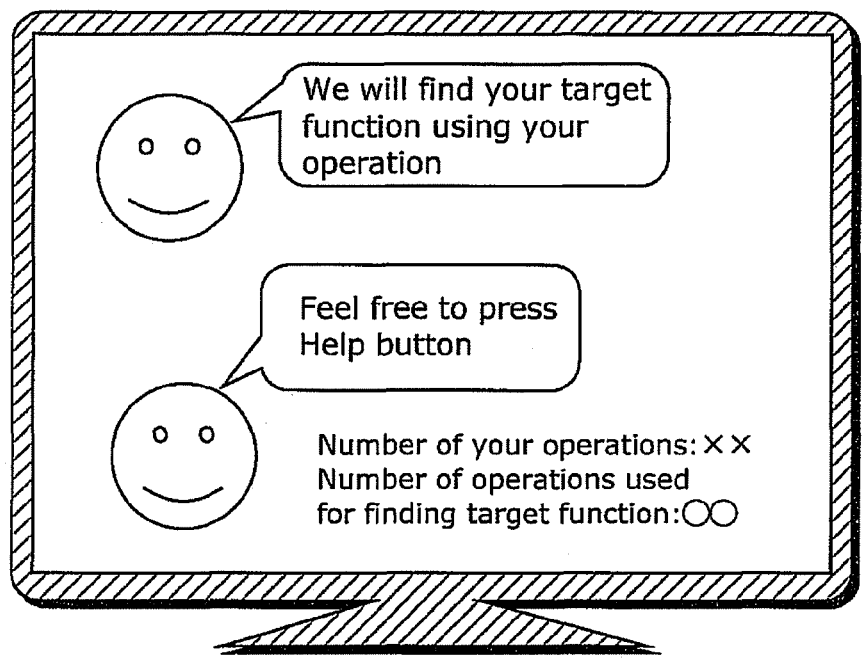
FIG. 19C shows an example of a screen displayed as part of operation support according to an embodiment of the present invention.

FIGS. 19A to 19C each show an example of an operation support screen. First, the operation support determination unit 110 lists the functions in descending order of the inference scores. The operation support determination unit 110 causes the output unit 111 to display, as shown in FIG. 19A, the description of each function listed (the function description indicated in the item 1602 of the data shown in FIG. 17). It is to be noted that in FIG. 19A, the words highly related to the user's input records are shown with emphasis, so that the user can easily understand with what kind of standard the operation support apparatus 100 has obtained the inference result.

Next, when the user selects an item which the user thinks is his target function, a manual related to the selected function is displayed as shown in FIG. 19B. It is to be noted that the information displayed when a function is selected is not limited to a related page in the manual. For example, it may be a screen or video pre-created for the operation support purposes. Alternatively, the screen may change to a screen of the recording device which allows execution of the selected function.

Furthermore, as shown in FIG. 19C, the number of operations used for the target function inference and the number of operations not used for the target function inference may be displayed before the operation support. Here, it may be determined whether or not the number of operations used for the target function inference and the number of operations not used for the target function inference should be displayed, depending on the number of operations not used for the target function inference. For example, when the number of operations not used for the target function inference (non-thinking operations) is larger than a threshold, the display as shown in FIG. 19C may be presented so that an effect of reducing the time period for which the user will be confused next time can be expected.

Figure 20:
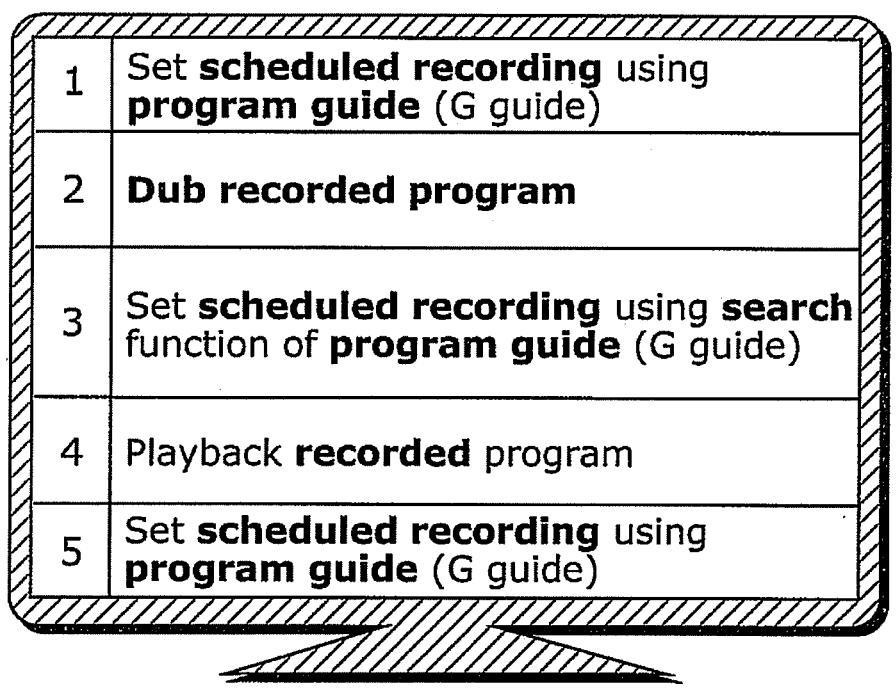
FIG. 20 shows an example of a screen displayed as part of operation support according to an embodiment of the present invention.

FIG. 20 shows an example of an operation support screen in the case where the operation load is calculated as above and no extraction of the operation records to be used for the target function inference is performed using the result of such calculation. In the case where the operation records are not extracted, the target function inference is performed using all the selected items included in the data shown in FIG. 16. Thus, functions related to the items "playback" and "dub" selected in the non-thinking operations are given higher ranks in the inference result, with the result that a function related to scheduled recording, which is the user's target function, is given a lower rank in the inference result. When the user's target function is given a lower rank in the inference result, the user needs to look through a greater number of functions to find the target function, which results in a larger burden on the user.

Referring back to FIG. 3, the recording device operation execution unit 102 executes the target function of the recording device instructed by the user based on the result of the operation support (S310).

As described thus far, the operation support apparatus according to the present embodiment can delete the non-thinking operation causing deterioration in the target function inference accuracy, from the operation records to be used for the target function inference. The non-thinking operation is an operation that the user performs without considering the likeliness of the operation enabling access to the target function, or an operation that the user performs thinking that the operation is weakly related to the target function. This means that the operation support apparatus according to the present embodiment enables the target function inference using only the operations that the user performs thinking that such operations are highly related to the target function. As a result, the target function can be inferred more accurately, enabling provision of appropriate operation support for the user.

(First Variation)

Although the above embodiment has described the remote control-operated recording device as the operation target, the present invention is also applicable to a device which includes, as an input device, a pointing device such as a touch panel. For such a device having a pointing device as the input device, the items stored in the operation record storage unit 104 and the method by which the operation load calculation unit 106 calculates the operation load are different from those of the above embodiment. This variation only describes the processing unique to such a device having a pointing device as the input device, as the difference from the above embodiment.

Figure 21:
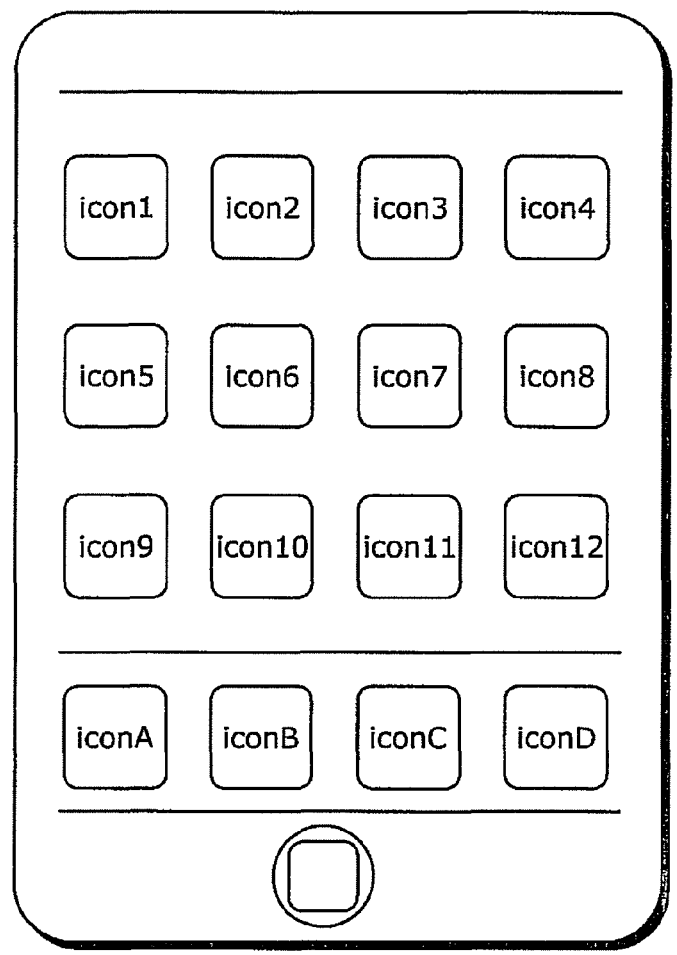
FIG. 21 shows an example of an operation screen of a device which includes a pointing device as an input unit according to a first variation of an embodiment of the present invention.

FIG. 21 shows an example of an operation screen of a device including a pointing device as an input unit. Icons "icon1" to "icon12" and icons "iconA" to "iconD" are user-selectable icons. Upon user's selection of an icon, a screen associated with the selected icon is displayed.

FIG. 22 shows an example of selection record data stored in the operation record storage unit 104. This operation record data includes such operation records as below. For example, the user selects an icon on the screen shown in FIG. 21. However, the user judges that there is no appropriate information on the screen displayed as a result of the icon selection, and thus performs an operation such as "return" so that the screen shown in FIG. 21 is re-displayed, and selects another icon. The operation records shown in FIG. 22 are records of such operations repeated.

The operation records of FIG. 22 include items 2101 to 2106. The item 2101 indicates a select number assigned every time an icon is selected. The item 2102 indicates the name of a selected icon. The item 2103 indicates the coordinates of the selected icon which are expressed as a two-dimensional vector. The item 2104 indicates a moving distance necessary for a movement from a previously-selected icon to a currently-selected icon. More specifically, the moving distance involved in the operation of the select number "2" for selecting the icon "icon8" is the distance between the previously-selected icon "icon1" and the currently-selected icon "icon8". This distance is a distance between the center coordinates of the respective icons, for example.

The item 2105 indicates a moving operation vector which is calculated by subtracting the coordinates of a previously-selected icon from the coordinates of a currently-selected icon. The moving operation vector represents a path along which the user moves a pointer, which is a mouse, finger, or pen, for example. The item 2106 indicates a cosine scale which is a cosine value of an angle between the moving operation vector of a previously-selected icon and the moving operation vector of a currently-selected icon. For example, the cosine scale of the icon "icon7" is a cosine value of an angle between the moving operation vector of the previously-selected icon "icon8" and the moving operation vector of the icon "icon7".

Figure 23A:
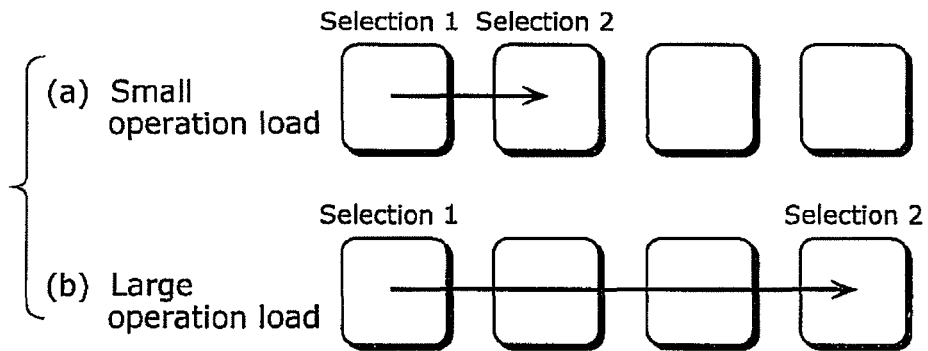
FIG. 23A is a first diagram for explaining an operation load according to the first variation of an embodiment of the present invention.
Figure 23B:
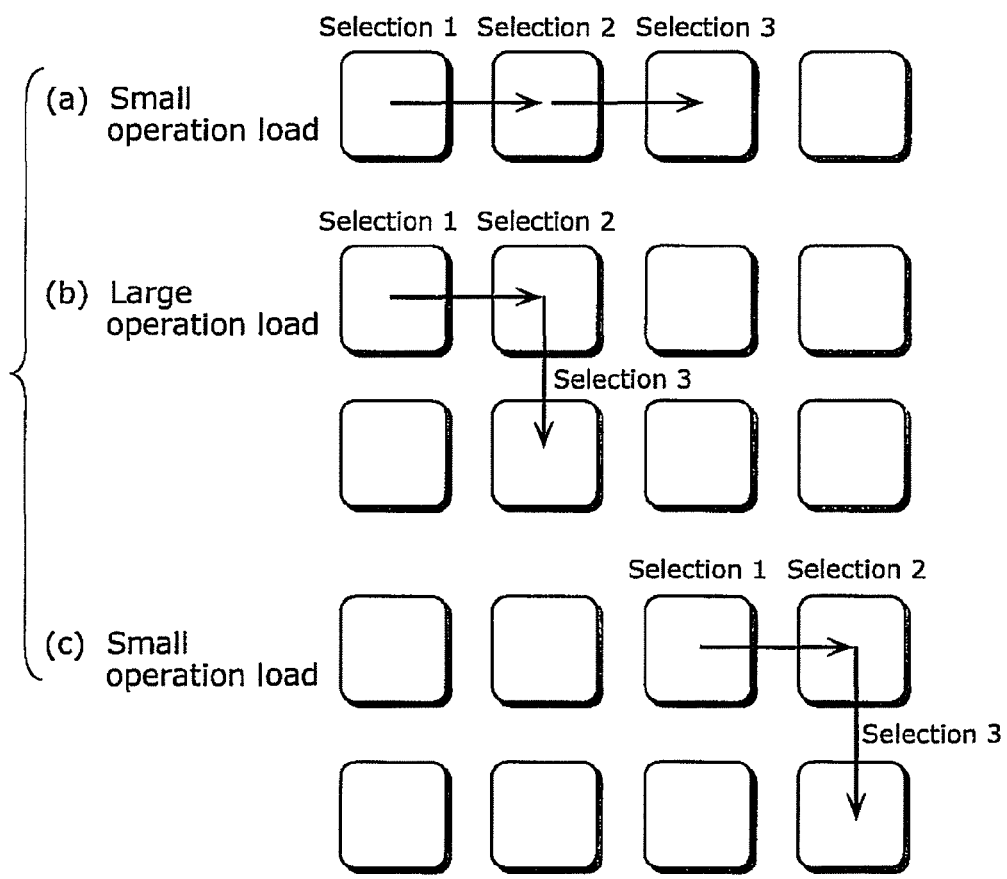
FIG. 23B is a second diagram for explaining the operation load according to the first variation of an embodiment of the present invention.

The operation load calculation unit 106 calculates the operation load using, among the operation record data as shown in FIG. 22, the moving distance indicated in the item 2104 and the cosine scale indicated in the item 2106. More specifically, the operation load calculation unit 106 calculates the operation load by adding the value of the moving distance multiplied by a and the value of the cosine scale multiplied by β (where α and β are both positive real numbers). This is based on the idea that the load on the user increases as the pointer moving distance becomes longer. It is also based on the idea that the load on the user increases as the angle between the path of the pointer movement necessary for the previous operation and the path of the pointer movement necessary for the current operation becomes larger. For example, the pointer moving distance shown in part (b) of FIG. 23A is longer than the pointer moving distance shown in part (a) of FIG. 23A. Thus, the pointer movement shown in part (b) of FIG. 23A involves an operation load relatively larger than that of the pointer movement shown in part (a) of FIG. 23A. Furthermore, the change in the pointer moving direction shown in part (b) of FIG. 23B is larger than the change in the pointer moving direction shown in part (a) of FIG. 23B. Thus, the pointer movement shown in part (b) of FIG. 23B involves an operation load relatively larger than that of the pointer movement shown in part (a) of FIG. 23B. However, depending on the positions of the icons, it is in some cases necessary to change the pointer moving direction. For example, when there is no icon on the right of the icon selected in "selection 2" as shown in part (c) in FIG. 23B, there is no choice but to change the pointer moving direction in order to select the next icon. In such a case, the operation load may be determined as small despite the large change in the moving direction. For example, it may be determined that the operation load in such a case is the same as the operation load in the case of part (a) of FIG. 23B.

In such a manner, the operation load calculation unit 106 calculates the operation load. As in the above embodiment, the operation load is compared with a predetermined threshold in S1403 of FIG. 15, the number of consecutive operations is calculated, and it is determined whether or not the operations are selections of items in the same group. Through this processing, it is determined whether or not the operation is the non-thinking operation.

It is to be noted that the icon grouping necessary for the processing in S1405 is performed based on words indicated on the icons or icon layout information as in the above embodiment.

The other processing is the same as that of the above embodiment, and thus the description thereof is not repeated.

As described, the pointer moving distance and the angle between the pointer moving paths are used. With this, even with a device including a pointing device as the input device, it is possible to delete the non-thinking operation as in the case of a device including a remote control as the input device. As a result, the target function can be inferred more accurately, enabling provision of appropriate operation support for the user.

(Second Variation).

In the above embodiment, the operation support using the target function inference is provided for the user upon the user's operation support request. However, the operation support apparatus may detect that the user has started the non-thinking operation and provide the user with operation support with earlier timing.

Figure 24:
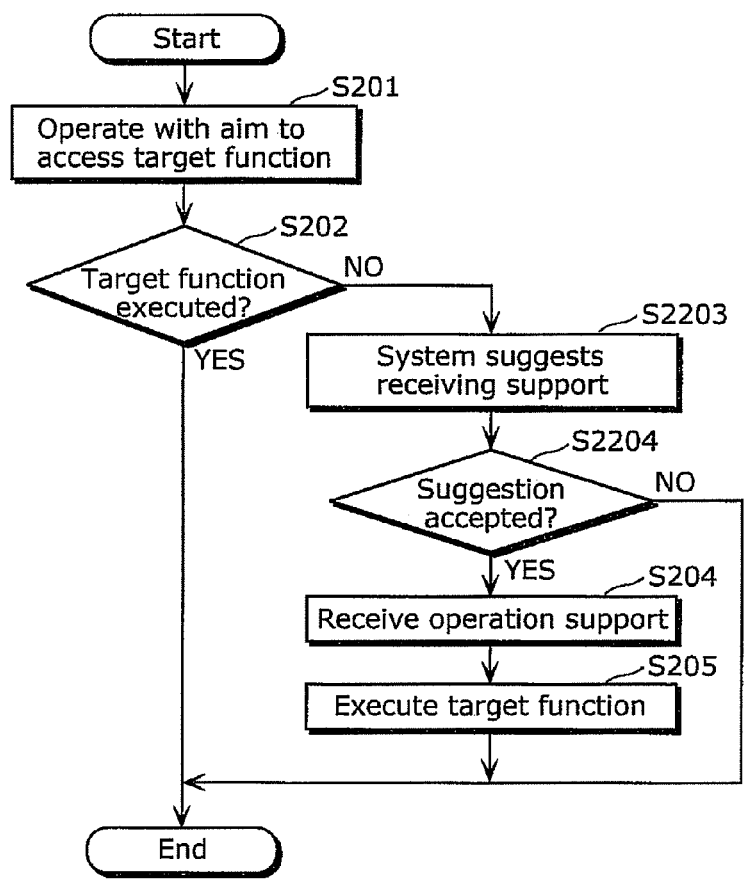
FIG. 24 is a flowchart showing a main operation of a user according to a second variation of an embodiment of the present invention.
Figure 25:
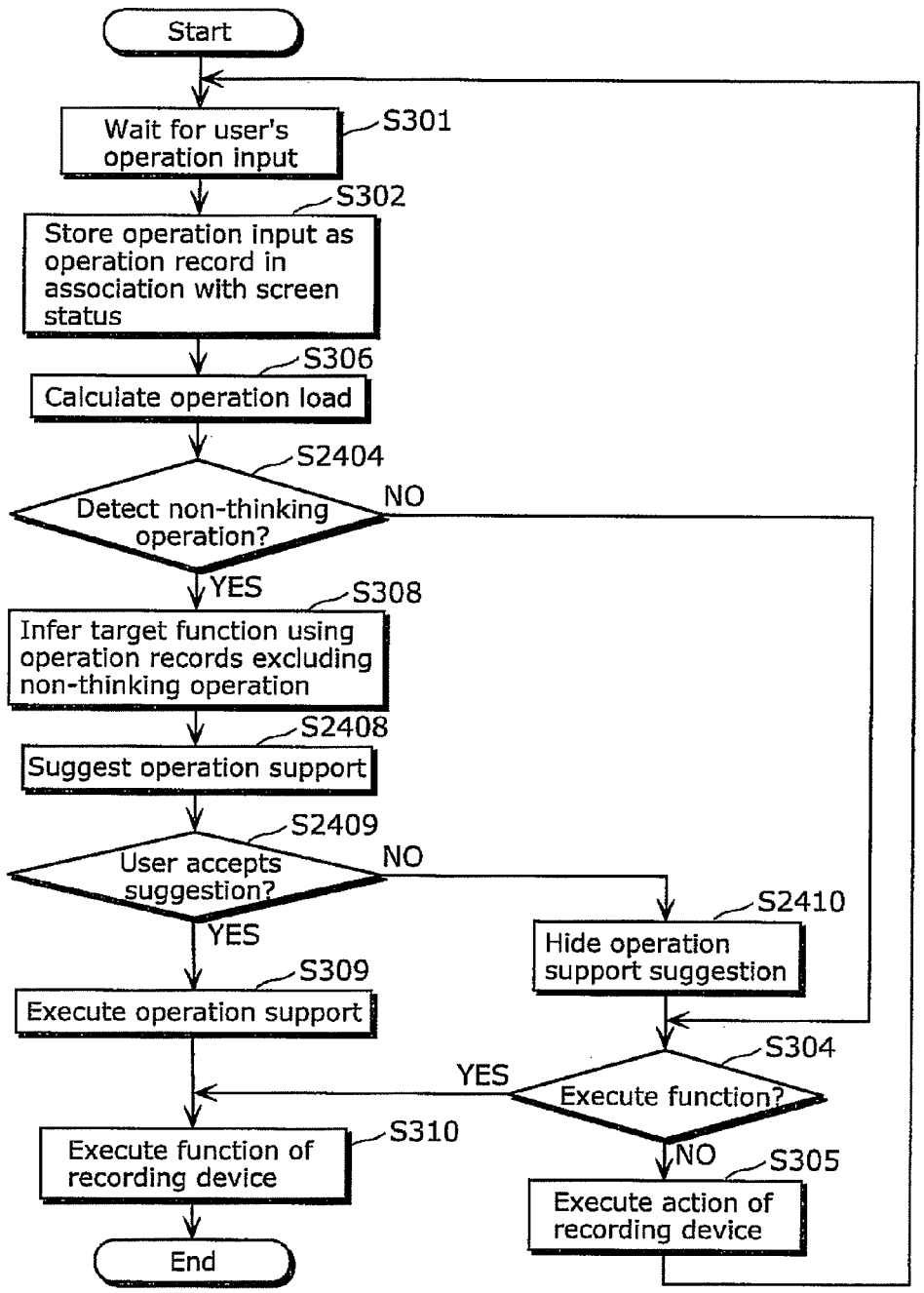
FIG. 25 is a flowchart showing main processing of an operation support apparatus according to the second variation of an embodiment of the present invention.

FIGS. 24 and 25 show the operation procedure of the user and the processing procedure of the operation support apparatus when the operation support apparatus provides operation support, respectively. Hereinafter, each process is described focusing on the differences from FIGS. 2 and 3. It is to be noted that the method of calculating the operation load and the method of extracting the non-thinking operation are the same as those of the above embodiment, and thus the descriptions thereof are not repeated.

As shown in FIG. 24, when the user is unable to execute the target function (NO in S202), the operation support apparatus suggests receiving operation support (S2203). By accepting such an operation support suggestion from the operation support apparatus 100 (YES in S2204), the user receives operation support from the operation support apparatus 100 (S204). Then, the user executes the target function based on the operation support (S205).

As shown in FIG. 25, the operation support apparatus 100 calculates the operation load (S306) and determines whether or not the user's operation is the non-thinking operation (S2404) every time the user's input is received. When it is determined that the subject operation is not the non-thinking operation (NO in S2404), the operation support apparatus 100 executes an action of an ordinary operation by the device (S304, S305, S310). When it is determined that the subject operation is the non-thinking operation (YES in S2404), the target function is inferred using operation records excluding the non-thinking operation (S308), and operation support is suggested to the user (S2408).

Figure 26A:
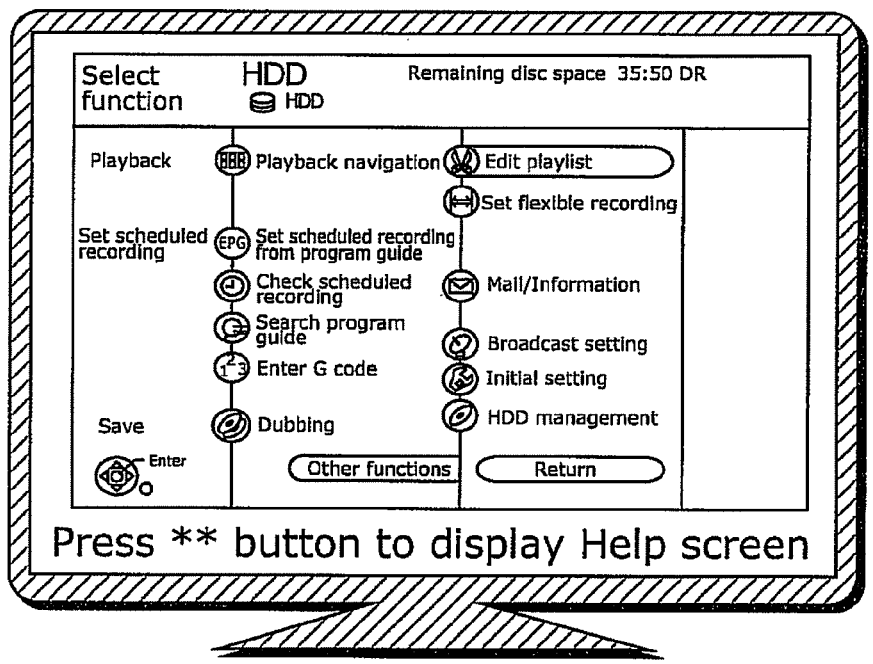
FIG. 26A shows an example of a screen displayed as part of operation support according to the second variation of an embodiment of the present invention.
Figure 26B:
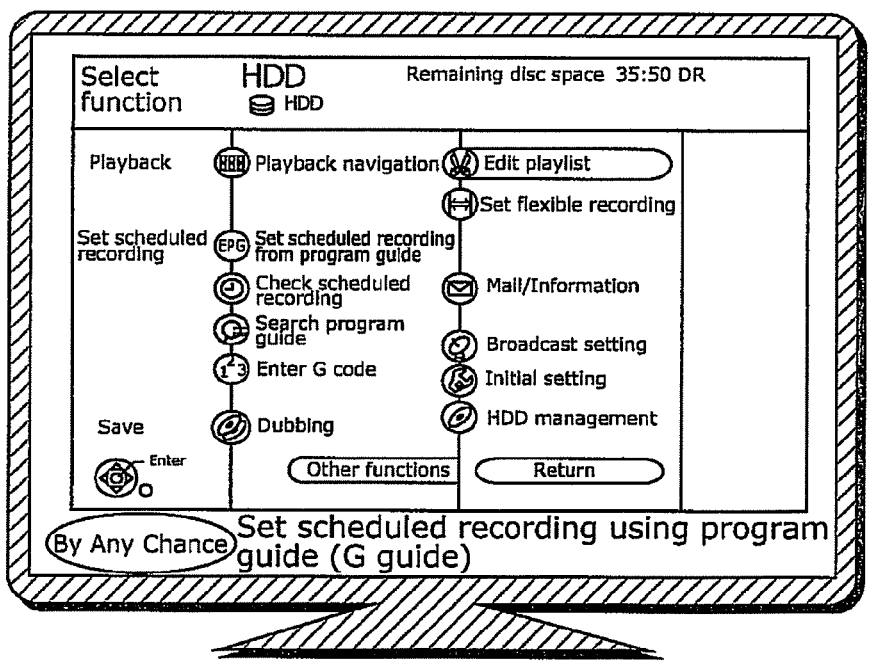
FIG. 26B shows an example of a screen displayed as part of operation support according to the second variation of an embodiment of the present invention.

FIGS. 26A and 26B each show an example of a screen displayed when operation support is suggested. FIG. 26A shows an example of a screen showing a message encouraging the user to press a guide button on the remote control, and FIG. 26B shows an example of a screen showing the title of an inferred function or the like. As shown in FIG. 26B, operation support which is provided by presenting one function and information thereof in a single operation is less burdensome for the user. However, when the presented function is not the user's target function, the load on the user increases.

In view of the above, the reliability of the target function inference result may be calculated to determine which function should be displayed or to control the number of functions to be displayed. Here, the reliability may be calculated using the number of selected items used for the target function inference, the number of words included in the selected items, the appearance frequency of such words in the manual, and so on. The reliability may also be calculated using the similarity or distribution of the similarity between each function calculated in the target function inference and a sequence of operations.

Despite the presentation of information suggesting operation support as shown in FIGS. 26A and 26B, there are cases where the user continues his operations or performs an operation to make the display of the operation support suggestion disappear using a cancel button or the like (NO in S2409). In such a case, the output unit 111 deletes the information suggesting operation support displayed on the screen of the output unit 111 (S2410).

In such a manner, every time the user's input operation is received, the operation load of the operation is calculated and whether or not the operation is the non-thinking operation is determined. This makes it possible to suggest operation support immediately after the non-thinking operation is detected. As a result, it is possible to reduce the number of the non-thinking operations that the user performs without considering the likeliness of the operations enabling access to the target function, or the non-thinking operations that the user performs thinking that the operations are weakly related to the target function. This makes operation support less burdensome for the user.

As described, according to the above embodiment, the present invention is applicable to devices in general that include a selection interface and infer the user's intention using the user's operation records. Thus, the industrial applicability of the present invention is significant as it can be applied to not only the recording device described in the embodiment but also various devices such as mobile phones, car navigation systems, and music/video players.

Thus far, the operation support apparatus according to an embodiment of the present invention has been described. However, the present invention is not limited to this embodiment.

For example, although the operation support apparatus provides the user with support for operating the recording device, the operation support may be provided for operating not only the recording device but also other devices as long as they are user-operated. For example, the operation support may be provided for a video player which plays video or an audio player which plays audio.

The above-described operation support apparatus may be specifically configured as a computer system including a microprocessor, a ROM, a RAM, a hard disk drive, a display unit, a keyboard, a mouse, and so on. In the RAM or the hard disk drive, a computer program is stored. Through the operation of the microprocessor according to the computer program, the operation support apparatus implements its function. Here, the computer program is a combination of several instruction codes each indicating a command for a computer to perform in order to implement a predetermined function.

Furthermore, the constituent elements of the operation support apparatus may be partially or collectively configured as a single system Large Scale Integration (LSI) circuit. The system LSI is a super-multifunctional LSI manufactured as one chip on which multiple constituent elements are integrated, and is specifically a computer system including a microprocessor, a ROM, a RAM, and so on. In the RAM, a computer program is stored. Through the operation of the microprocessor according to the computer program, the system LSI implements its function.

Moreover, the constituent elements of the operation support apparatus may be partially or collectively configured as an IC card or a single module insertable to the operation support apparatus. The IC card or the module is a computer system including a microprocessor, a ROM, a RAM, and so on. The IC card or the module may include the above super-multifunctional LSI. Through the operation of the microprocessor according to the computer program, the IC card or the module implements its function. The IC card or the module may be tamper-resistant.

Furthermore, the present invention may be implemented as the above-described methods. In addition, the present invention may be implemented as a computer program which causes a computer to execute such methods or as a digital signal which includes the above computer program.

The present invention may also be implemented as a computer-readable recording medium on which the above computer program or digital signal is recorded. The examples include a flexible disk, a hard disk, a CD-ROM, an MO, a DVD, a DVD-ROM, a DVD-RAM, a BD (Blu-ray Disc®), a semiconductor memory, and so on. Furthermore, the present invention may be implemented as the above digital signal recorded on such recording media.

In addition, the present invention may be implemented through transmission of the above computer program or digital signal via a telecommunication line, a wireless or wired communication line, a network represented by the Internet, a data broadcast, and so on.

Moreover, the present invention may be implemented as a computer system including a microprocessor and a memory, whereby the above computer program is stored in the memory, and the microprocessor operates according to the computer program.

In addition, the above program or digital signal recorded on the recording media mentioned above may be transmitted to another independent computer system, so that the present invention can be implemented by the other independent computer system. Alternatively, the above program or digital signal may be transmitted to another independent computer system via the network or the like mentioned above, so that the present invention can be implemented by the other independent computer system.

Furthermore, the above embodiment and variations may be combined.

The embodiment disclosed above has been described as an example in all aspects, and should not be understood as limiting the present invention. The scope of the present invention is indicated by not the above description but the claims, and is intended to include all modifications within the meanings and the scope equivalent to the claims.

INDUSTRIAL APPLICABILITY

The present invention is applicable to operation support apparatuses and so on that infer the user's target function from the user's operation records and provide the user with support based on the inference result for operating devices having various functions such as computer applications, electronic products, or AV devices.

REFERENCE SIGNS LIST

100 Operation support apparatus
101 User operation input unit
102 Recording device operation execution unit
103 Screen information storage unit
104 Operation record storage unit
105 Timer
106 Operation load calculation unit
107 Non-thinking operation determination unit
108 Target function inference unit
109 Target function candidate storage unit
110 Operation support determination unit
111 Output unit
112 Operation support unit

The invention claimed is:

1. An operation support apparatus which provides a user with operation support for operating a device, said operation support apparatus comprising:
    an operation record storage unit configured to store records of selecting operations each performed by the user for execution of a function of the device;
    an operation load calculation unit configured to calculate an operation load on the user in performing a selecting operation included in one of the records stored in said operation record storage unit, using the selecting operation and a previous selecting operation included in another one of the records;
    a non-thinking operation determination unit configured to determine whether or not the selecting operation included in one of the records stored in said operation record storage unit is a non-thinking operation, by determining that the selecting operation is more likely to be the non-thinking operation when the operation load on the user calculated by said operation load calculation unit is smaller, the non-thinking operation being a randomly-performed operation; and
    an operation support unit configured to provide the user with the operation support based on the records of the selecting operations excluding the selecting operation determined as the non-thinking operation by said non-thinking operation determination unit.

2. The operation support apparatus according to claim 1, wherein each selecting operation performed by the user for execution of the function of the device is an operation of selecting a menu item on a menu-item selection interface, and
said operation load calculation unit is configured to calculate the operation load of each selecting operation, using at least one of the following pieces of information about a selected-item changing operation: the number of button presses necessary for the selected-item changing operation; the number of types of buttons pressed for the selected-item changing operation; and information about a change between a first-pressed button in the selected-item changing operation and a last-pressed button in a previous selected-item changing operation, the selected-item changing operation being an operation by the user necessary between the previous selecting operation and the selecting operation.

3. The operation support apparatus according to claim 2, wherein said operation load calculation unit is configured to calculate the operation load such that the operation load increases as the number of button presses necessary for the selected-item changing operation becomes larger.

4. The operation support apparatus according to claim 2, wherein said operation load calculation unit is configured to calculate the operation load such that the operation load increases as the number of types of buttons pressed for the selected-item changing operation becomes larger.

5. The operation support apparatus according to claim 2, wherein said operation load calculation unit is configured to calculate the operation load such that the operation load increases as a degree of change between the first-pressed button in the selected-item changing operation and the last-pressed button in the previous selected-item changing operation becomes greater.

6. The operation support apparatus according to claim 2, wherein said operation load calculation unit is further configured to revise the number of button presses necessary for the selected-item changing operation, by disregarding a selected item which has been selected a certain number of times or more in past for execution of a function of the device.

7. The operation support apparatus according to claim 1, wherein said non-thinking operation determination unit is configured to determine that the selecting operation included in one of the records stored in said operation record storage unit is not the non-thinking operation when the operation load on the user calculated by said operation load calculation unit is larger than a predetermined threshold.

8. The operation support apparatus according to claim 1, wherein each selecting operation performed by the user for execution of the function of the device is an operation of selecting a menu item on a menu-item selection interface, and
said non-thinking operation determination unit is further configured to determine, according to grouping of menu items displayed on a menu select screen, that the selecting operation included in one of the records stored in said operation record storage unit is not the non-thinking operation when a menu item selected by the selecting operation and a menu item selected by the previous selecting operation included in the other one of the records belong to a same group.

9. The operation support apparatus according to claim 8, wherein the grouping is performed using at least one of layout information of the menu items on the menu select screen and font information of the menu items.

10. The operation support apparatus according to claim 8, wherein the grouping is performed using semantic similarity between words included in the menu items on the menu select screen.

11. The operation support apparatus according to claim 1, wherein said non-thinking operation determination unit is configured to determine whether or not the selecting operation included in one of the records stored in said operation record storage unit is the non-thinking operation, by determining that the selecting operation is more likely to be the non-thinking operation when the operation load on the user calculated by said operation load calculation unit is smaller and operations involving a smaller operation load are consecutively performed.

12. The operation support apparatus according to claim 1, wherein each selecting operation performed by the user for execution of the function of the device is an operation of selecting a button which is provided on a remote controller used for operating the device and is associated with the function of the device, and
in the case where buttons on the remote controller are grouped using at least one of shape information, color information, and layout information of the buttons, said operation load calculation unit is configured to calculate the operation load such that the operation load is smaller when buttons in a same group are consecutively pressed, than when buttons in different groups are consecutively pressed.

13. The operation support apparatus according to claim 1, wherein each selecting operation performed by the user for execution of the function of the device is a selecting operation using a pointing device for operating the device, and
said operation load calculation unit is configured to calculate the operation load using at least one of (i) a pointer moving distance necessary between the selecting operation and the previous selecting operation and (ii) an angle between a pointer moving path necessary for the selecting operation and a pointer moving path necessary for the previous selecting operation.

14. The operation support apparatus according to claim 13, wherein said operation load calculation unit is configured to calculate the operation load such that the operation load increases as the pointer moving distance becomes longer.

15. The operation support apparatus according to claim 13, wherein said operation load calculation unit is configured to calculate the operation load such that the operation load increases as the angle becomes larger.

16. The operation support apparatus according to claim 1, wherein said non-thinking operation determination unit is further configured to calculate semantic similarity between a word included in the selecting operation and a word included in the previous selecting operation, and determine that the selecting operation is less likely to be the non-thinking operation when the calculated semantic similarity is greater, the selecting operation being included in one of the records stored in said operation record storage unit, and the previous selecting operation being included in the other one of the records.

17. The operation support apparatus according to claim 1, wherein said operation support unit is further configured to display a message according to the number of selecting operations classified as the non-thinking operation.

18. The operation support apparatus according to claim 1, wherein, every time the user performs a selecting operation, said operation load calculation unit is configured to calculate the operation load of the selecting operation,
every time the user performs a selecting operation, said non-thinking operation determination unit is configured to determine whether or not the selecting operation is the non-thinking operation, and
when the selecting operation by the user is determined as the non-thinking operation, said operation support unit is configured to provide the user with the operation support based on the records of the selecting operations excluding the selecting operation determined as the non-thinking operation.

19. An operation support method of providing, using a computer, a user with operation support for operating a device, said operation support method comprising:
calculating an operation load on the user in performing a selecting operation included in one of records stored in an operation record storage unit, using the selecting operation and a previous selecting operation included in another one of the records, the selecting operation being performed by the user for execution of a function of the device;

determining whether or not the selecting operation is a non-thinking operation by determining that the selecting operation is more likely to be the non-thinking operation when the operation load on the user calculated in said calculating is smaller, the non-thinking operation being a randomly-performed operation; and providing the user with the operation support based on the records of selecting operations excluding the selecting operation determined as the non-thinking operation in said determining.

20. A non-transitory computer readable medium storing a computer-executable program for providing a user with operation support for operating a device, said program causing a computer to execute:

calculating an operation load on the user in performing a selecting operation included in one of records stored in an operation record storage unit, using the selecting operation and a previous selecting operation included in another one of the records, the selecting operation being performed by the user for execution of a function of the device;

determining whether or not the selecting operation is a non-thinking operation by determining that the selecting operation is more likely to be the non-thinking operation when the operation load on the user calculated in the calculating is smaller, the non-thinking operation being a randomly-performed operation; and providing the user with the operation support based on the records of selecting operations excluding the selecting operation determined as the non-thinking operation in the determining.

21. An operation support apparatus which provides a user with operation support for operating a device, said operation support apparatus comprising:

an operation load calculation unit configured to calculate an operation load on the user in performing a selecting operation included in one of records of selecting operations stored in an operation record storage unit, using the selecting operation and a previous selecting operation included in another one of the records, the selecting operations being operations each performed by the user for execution of a function of the device;

a non-thinking operation determination unit configured to determine whether or not the selecting operation included in one of the records stored in said operation record storage unit is a non-thinking operation, by determining that the selecting operation is more likely to be the non-thinking operation when the operation load on the user calculated by said operation load calculation unit is smaller, the non-thinking operation being a randomly-performed operation; and an operation support unit configured to provide the user with the operation support based on the records of the selecting operations excluding the selecting operation determined as the non-thinking operation by said non-thinking operation determination unit.

* * * * *